US012482183B2

(12) United States Patent
Aggarwal

(10) Patent No.: US 12,482,183 B2
(45) Date of Patent: Nov. 25, 2025

(54) SYSTEM AND METHOD FOR CREATING METAVERSE FOR FUTURE SCENARIOS

(71) Applicant: Scry Analytics, Inc., Saratoga, CA (US)

(72) Inventor: Alok Aggarwal, Saratoga, CA (US)

(73) Assignee: Scry Analytics, Inc., Saratoga, CA (US)

( * ) Notice: Subject to any disclaimer, the term of this patent is extended or adjusted under 35 U.S.C. 154(b) by 265 days.

(21) Appl. No.: 18/311,234

(22) Filed: May 2, 2023

(65) Prior Publication Data

US 2024/0371094 A1    Nov. 7, 2024

(51) Int. Cl.
*G06T 17/05*    (2011.01)
*G06T 13/60*    (2011.01)

(52) U.S. Cl.
CPC ............. *G06T 17/05* (2013.01); *G06T 13/60* (2013.01)

(58) Field of Classification Search
CPC ......... G06T 17/05; G06T 13/60; A63F 13/00; G06F 3/011
See application file for complete search history.

(56) References Cited

U.S. PATENT DOCUMENTS

| 2017/0277389 | A1* | 9/2017 | Matas Rodriguez | ... G06T 17/05 |
| 2018/0253882 | A1* | 9/2018 | Guo | ......................... G06F 3/011 |
| 2019/0139321 | A1* | 5/2019 | Kocharlakota | .......... G06F 3/011 |

FOREIGN PATENT DOCUMENTS

KR    20130060410 A    *    6/2013    ............. G06T 17/05

OTHER PUBLICATIONS

Harris, Claire L., et al. "Dynamic virtual ecosystems as a tool for detecting large-scale responses of biodiversity to environmental and land-use change." arXiv preprint arXiv:1911.12257 (2019). (Year: 2019).*

* cited by examiner

*Primary Examiner* — William A Beutel
*Assistant Examiner* — Chris Alejandro Puntier
(74) *Attorney, Agent, or Firm* — CHIP Law Group

(57) ABSTRACT

A metaverse system generates a metaverse for an activity to be performed by a user in a geographical region at a future time period. The metaverse is generated based on predicted micro-weather and a predicted topographical map of the geographical region for the future time period, and a plurality of behavioral aspects of a plurality of biodiversity elements associated with the geographical region predicted for the future time period. The generated metaverse includes the predicted topographical map, one or more biodiversity avatars of one or more biodiversity elements, respectively, that are predicted to be present in the geographical region at the future time period based on the plurality of behavioral aspects, and a user avatar of the user. The generated metaverse is presented to the user to enable the user to immersively experience the activity that is to be performed at the future time period.

14 Claims, 19 Drawing Sheets

SYSTEM AND METHOD FOR CREATING METAVERSE FOR FUTURE SCENARIOS

FIELD OF USE

The present disclosure relates generally to metaverse, and, more particularly, to a system and a method for creating a metaverse for future scenarios.

BACKGROUND

Whenever a user plans any outdoor activity (such as hiking, cycling, skiing, sightseeing, underwater exploration, or the like), the user is typically inclined to check various forecasts (e.g., weather forecasts) associated with the activity to imagine how the activity is likely to pan out and make a decision accordingly. Currently, the forecasts are for large regions such as a city, a town, or the like, and hence, may not provide accurate information to the user about the activity. Further, the forecasts are presented to the user in a graphical form on a display screen. As a result, the user experience is significantly degraded and the user is not aided in making an informed decision.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Methods for creating metaverse for future scenarios are provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
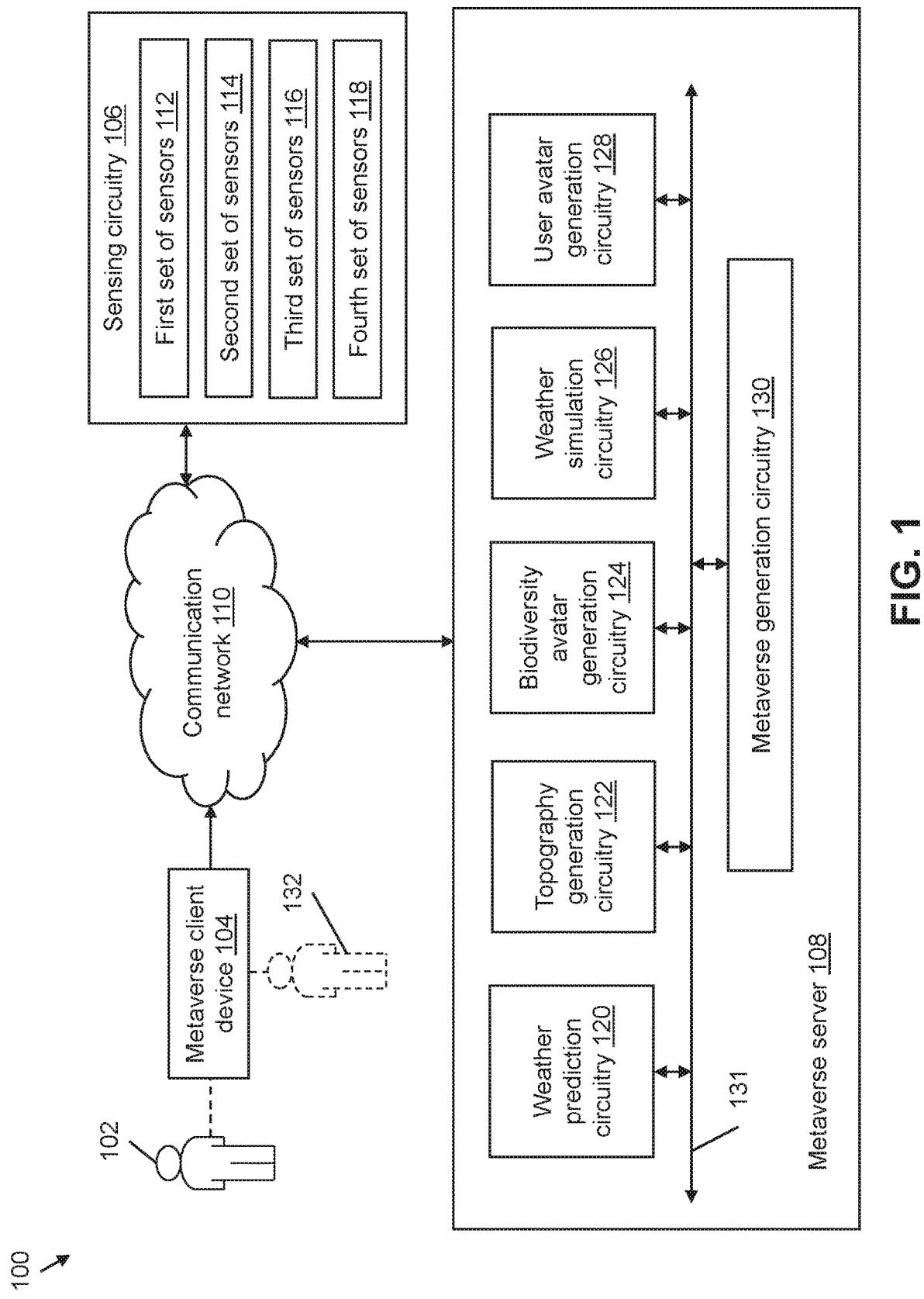
FIG. 1 illustrates a schematic diagram of a metaverse environment for creating a metaverse for a future scenario, in accordance with an embodiment of the present disclosure.

The detailed description of the appended drawings is intended as a description of the embodiments of the present disclosure and is not intended to represent the only form in which the present disclosure may be practiced. It is to be understood that the same, similar, or equivalent functions may be accomplished by different embodiments that are intended to be encompassed within the spirit and scope of the present disclosure.

In recent years, with the advancement in technology and networking, users can access multiple virtual simulations. A virtual simulation is essentially a computer-based simulation that may or may not mimic a real-world environment. Metaverse is a virtual shared space and future iteration of the Internet with multiple virtual simulations. More precisely, the metaverse is a three-dimensional world, location, or environment, fantastical or not, real or not, in which users in the form of avatars can experience, participate, and interact with objects, people, and non-player characters, in a way that transcends the limits of the physical world and is free from the constrains of human forms. It is made possible by the convergence of numerous technologies including virtual reality and artificial intelligence. Unlike the Internet, the metaverse provides an immersive experience to the users. Additionally, the metaverse offers an immersive gaming experience, real-time virtual interactions, and options to rent, buy, or sell virtual properties.

In the present disclosure, whenever an outdoor activity (e.g., hiking, rock climbing, sightseeing, star gazing, diving, skiing, snorkeling, watching a sport such as football in a stadium, attending a concert in an arena, watching a theatrical performance in an arena, or the like) is planned by the user, a metaverse for the future scenario (e.g., the user performing the activity in the near-future) may be created and presented to the user to enable the user to visualize how the activity is likely to pan out and aid the user in making an informed decision. To create such a metaverse various operations may be executed. For example, micro-weather data of a geographical region associated with the activity is collected to predict weather conditions of the geographical region for outdoor activities in the future time period. Further, topographical parameters of the geographical region are detected and a topographical map of the geographical region is generated based on the detected topographical parameters. The weather conditions may be simulated in the topographical map. Additionally, data related to a plurality of biodiversity elements is detected to predict behavioral aspects of plants, animals, and human beings, in the geographical region. A user avatar and avatars of various biodiversity elements that are predicted to be present in the geographical region at the future time period are generated. Further, a metaverse is created by integrating the predicted micro-weather, the topographical map, the avatar of the user, and the avatars of various biodiversity elements. The activity is immersively experienced by the user through the metaverse and the chosen activity may be planned by the user based on the experience. The immersive experience may enhance user engagement and improve decision-making for the user.

FIG. 1 illustrates a schematic diagram of a metaverse environment 100 for creating a metaverse for a future scenario, in accordance with an embodiment of the present disclosure. The metaverse environment 100 may include a user 102. The user 102 may plan an outdoor activity (hereinafter referred to as the "activity") to be undertaken in the near-future (e.g., one to twenty-four hours in the future). Examples of the activities may include hiking, cycling, star gazing, rock climbing, skiing, under-water exploration (such as diving, marine life exploration, snorkeling, or the like), attending an event, sightseeing, or the like. Each activity may have a geographical region associated therewith. Examples of the geographical region may include a trail, a ski run, a rock climbing route, a water body, an event venue, or the like. Thus, when the activity corresponds to one of hiking, cycling, star gazing, and sightseeing, the geographical region corresponds to the trail. Similarly, when the activity corresponds to skiing, the geographical region corresponds to the ski run, whereas, when the activity corresponds to rock climbing, the geographical region corresponds to the rock climbing route. Further, when the activity corresponds to underwater exploration, the geographical region corresponds to the water body, and when the activity corresponds to attending the event, the geographical region corresponds to the event venue. The aforementioned list of activities and associated geographical regions is exemplary and the scope of the present disclosure is not limited to it.

The user 102 may wish to envision how the activity is likely to pan out and then decide whether he/she wants to go ahead or cancel the activity. In that regard, the metaverse environment 100 may be utilized for creating the metaverse for the future scenario (e.g., for the user 102 performing the activity in the near-future). To create the metaverse, the metaverse environment 100 may further a metaverse client device 104, sensing circuitry 106, a metaverse server 108, and a communication network 110. The sensing circuitry 106, the metaverse server 108, and the metaverse client device 104 may be coupled to each other by way of the communication network 110.

Examples of the communication network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the metaverse environment 100 may connect to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The metaverse client device 104 may be associated with the user 102 and enable the user 102 to perform various operations associated with the creation and presentation of the metaverse for the future scenario. the metaverse client device 104 may be a head-mounted display system, an augmented reality (AR) system, a projection mapping system, a neural implant system, a retinal implant system, a virtual reality headset, smart contact lens, or other similar means to enable interaction with the user 102. the metaverse client device 104 may include a plurality of hardware components such as microphones, tracking sensors, displays, speakers, haptic sensors, brain-computer interfaces, or the like. When planning the activity, the metaverse client device 104 may be utilized by the user 102 to provide a user input. The user input may include the activity to be performed by the user 102, the geographical region associated with the activity (e.g., where the activity is to be performed), a future time period at which the user 102 intends to perform the activity, or the like. The metaverse client device 104 may be further configured to present the metaverse created for the future scenario to the user 102 via the metaverse client device 104 may thus provide an immersive and interactive experience of the future scenario by means of the plurality of hardware components.

The metaverse may refer to a computer-generated virtual world that offers an immersive experience to the user 102. Data may be considered a key building block for the metaverse. The sensing circuitry 106 may be configured to collect or ingest real-world data associated with the activity for enabling a virtual simulation of the activity in the metaverse. Examples of the real-world data may include, but are not limited to, weather data, topographical data, and biodiversity data of the geographical region associated with the activity and biometric data of the user 102. The geographical region associated with the activity may be a specific region where the user 102 intends to perform the activity and not a larger area such as a city, a town, or the like. For example, in case of hiking/cycling, the geographical region may correspond to a region encompassing a trail and not the entire forest or the entire town.

The sensing circuitry 106 may include multiple sets of sensors to collect the real-world data. For example, the sensing circuitry 106 may include first through fourth sets of sensors 112-118 that may be configured to collect the real-world data. The first set of sensors 112 may correspond to a micro-weather detection system that collects the weather data of the geographical region associated with the activity. The second set of sensors 114 may correspond to a topography detection system that collects the topographical data of the geographical region associated with the activity. Similarly, the third set of sensors 116 may correspond to a biodiversity detection system that collects the biodiversity data of the geographical region associated with the activity. Further, the fourth set of sensors 118 may correspond to a user data collection system that collects the biometric data of the user 102. The first through third sets of sensors 112-116 may be installed in and around the geographical region and the fourth set of sensors 118 may be installed on or around the user 102. Further, the sensing circuitry 106 may be configured to transmit the real-world data regarding the activity to the metaverse server 108 via the communication network 110. The real-world data may be utilized to create the metaverse for the future scenario of the user 102 performing the activity.

The first set of sensors 112 (also referred to as the micro-weather detection system) may be configured to detect micro-weather of the geographical region. Micro-weather may correspond to the weather conditions of a specific region or a small area which may be different from the weather conditions of a larger region or area. For example, the weather conditions for a portion of the forest may not be the same as the weather conditions for a neighboring city due to the presence of trees and water bodies in and around the forest. Similarly, the prevailing weather on one side of a mountain may be substantially different from the other side. The first set of sensors 112 may be further configured to detect a plurality of real-time weather parameters of the geographical region associated with the activity. The plurality of real-time weather parameters may include temperature, pressure, dust particles, mist, allergens, pollutants, wind speed, wind direction, precipitation, humidity, solar radiation, presence of smoke, visibility, wave attributes, water temperature, rainfall, snowfall, snowpack, salinity, Coriolis force, or the like. Thus, the first set of sensors 112 may include temperature sensors, pressure sensors, dust particulate sensors, air quality sensors, vibration sensors, humidity sensors, strain sensors, smoke detector sensors, wind speed and direction sensors, precipitation and rain gauges, solar radiation sensors, visibility sensors, ceilometers, image sensors, or the like. The type of weather parameters detected by the first set of sensors 112 may vary based on the type of the activity. The first set of sensors 112 may detect the plurality of real-time weather parameters at varying time intervals (such as during rain, thunderstorm, sandstorm, or the like) or at fixed time intervals (such as every fifteen minutes, sunrise, sunset, morning, night, or the like). Further, the first set of sensors 112 may transmit the detected plurality of real-time weather parameters to the metaverse server 108 via the communication network 110.

The second set of sensors 114 (also referred to as the topography detection system) may be configured to detect a plurality of real-time topographical parameters of the geographical region associated with the activity. The plurality of real-time topographical parameters may include characteristics of cliffs, plateaus, plains, hills, contours, ridges, depressions, elevations, rivers, lakes, valleys, seating areas, pitches, dugouts, stage, chutes, steep drops, cornices, rolling terrain, moguls, flood lights, ocean ridges, continental shelves, trenches, sea canyons, and sea corals, or the like. The characteristics include height, width, number, length, thickness, depth, sloping angle, size, curvature, and sunlight exposure. The second set of sensors 114 may include image sensors, light detection and ranging (LiDAR) sensors, ultrasonic sensors, global positioning system (GPS) sensors, satellites, drones, radio detection and ranging (radar), synthetic aperture radar (SAR), sound navigation and ranging (sonar), or the like. Two or more sensors of the second set of sensors 114 may operate in conjunction to detect the plurality of real-time topographical parameters. The type of topographical parameters detected by the second set of sensors 114 may vary based on the type of the activity. The second set of sensors 114 may detect the plurality of real-time topographical parameters at varying time intervals (such as during rain, thunderstorm, sandstorm, or the like) or at fixed time intervals (such as different seasons, days, weeks, months, years, or the like). Further, the second set of sensors 114 may transmit the detected plurality of real-time topographical parameters to the metaverse server 108 via the communication network 110.

The third set of sensors 116 (also referred to as the biodiversity detection system) may be configured to detect a plurality of real-time biodiversity parameters of a plurality of biodiversity elements associated with the geographical region. Biodiversity corresponds to all the different kinds of life one may find in an area, and it depends substantially on the existing weather conditions, seasons, and climate of the area. The plurality of biodiversity elements may thus include animals, organisms, birds, worms, plants, human beings, grasses, bushes, mosses, mammals, turtles, fishes, seaweeds, seagrasses, insects, rodents, and trees, or the like, present in the geographical region. Further, the plurality of real-time biodiversity parameters includes behavior patterns and characteristics of the plurality of biodiversity elements. The behavior pattern may include migration, camouflage, hibernation, social behavior, foraging, adaptations, or the like, whereas, the characteristics may include shape, color, size, sound, movement, or the like. The third set of sensors 116 may include video cameras, LiDAR sensors, infrared sensors, radio frequency identification (RFID) tags, accelerometers, listening devices, microphones, or the like. The type of biodiversity parameters detected by the third set of sensors 116 may vary based on the type of the activity. The third set of sensors 116 may detect the plurality of real-time biodiversity parameters at varying time intervals (such as during rains, snow, heatwaves, or the like) or at fixed time intervals (such as every fifteen minutes, morning, night, or the like). Further, the third set of sensors 116 may transmit the detected plurality of real-time biodiversity parameters of the plurality of biodiversity elements to the metaverse server 108 via the communication network 110.

The fourth set of sensors 118 (also referred to as the user data collection system) may be configured to accurately detect a plurality of user parameters. The plurality of user parameters may include body shape, movement, voice, facial structure, expressions, or the like, of the user 102. The fourth set of sensors 118 may include, cameras, microphones, LiDAR sensors, or the like. In an embodiment, the fourth set of sensors 118 may capture high-resolution images of the user 102 from different angles and perspectives. In another embodiment, the fourth set of sensors 118 may capture the height and shape of the user 102 using depth sensors (such as LiDAR sensors). The fourth set of sensors 118 may be available as portable devices, wearables (e.g., virtual reality headsets, smart contact lenses, brain-computer interfaces, or the like), fixed systems (such as those installed on monitors, televisions, or the like), hand-held devices, or the like. Further, the fourth set of sensors 118 may transmit the detected plurality of user parameters to the metaverse server 108 via the communication network 110.

Each of the first through fourth sets of sensors 112-118 may be part of the same system as the metaverse server 108 or may correspond to a third-party entity.

The sensing circuitry 106 (e.g., the first through fourth sets of sensors 112-118) may thus collect the real-world data regarding the activity. The real-world data may include the plurality of real-time weather parameters, the plurality of real-time topographical parameters, and the plurality of real-time biodiversity parameters of the plurality of biodiversity elements in the geographical region associated with the activity and the plurality of user parameters of the user 102. The sensing circuitry 106 may transmit the real-world data to the metaverse server 108 via the communication network 110 to enable the creation of the metaverse for the future scenario of the user 102 performing the activity.

The metaverse server 108 may be configured to process the received real-world data and generate various predictions regarding the weather, topography, biodiversity, or the like, of the geographical region associated with the activity. The metaverse server 108 may be a network of computers, a software framework, or a combination thereof, that may provide a generalized approach to create the server implementation. Examples of the metaverse server 108 may include, but are not limited to, personal computers, laptops, mini-computers, mainframe computers, any non-transient and tangible machine that can execute a machine-readable code, cloud-based servers, distributed server networks, or a network of computer systems. The metaverse server 108 may be realized through various web-based technologies and software frameworks including but not limited to Javabased, Python-based, .NET-based, Unity-based, Unreal-based, personal home page (PHP), other computer gaming software frameworks, or any similar framework.

The metaverse server 108 may be further configured to generate a metaverse indicating how the activity is likely to look in the near-future and present it to the user 102 by way of the metaverse client device 104. Thus, the user 102 may obtain the immersive experience of performing the desired activity in the metaverse by way of the metaverse client device 104. To perform the aforementioned operations, the metaverse server 108 may include weather prediction circuitry 120, topography generation circuitry 122, biodiversity avatar generation circuitry 124, weather simulation circuitry 126, user avatar generation circuitry 128, and metaverse generation circuitry 130. The weather prediction circuitry 120, the topography generation circuitry 122, the biodiversity avatar generation circuitry 124, the weather simulation circuitry 126, the user avatar generation circuitry 128, and the metaverse generation circuitry 130 may communicate with each other by way of a communication bus 131 or via other electronic communication methods.

The weather prediction circuitry 120 may include suitable logic, circuitry, and/or interfaces that may be configured to perform one or more operations. For example, the weather prediction circuitry 120 may be configured to receive the plurality of real-time weather parameters from the first set of sensors 112 via the communication network 110. The weather prediction circuitry 120 may be further configured to predict micro-weather of the geographical region associated with the activity for the future time period specified by the user 102. The weather prediction circuitry 120 may include a weather prediction model, a first memory (not shown), and a first processing unit (not shown) that executes the weather prediction model. Historical weather data associated with the geographical region may be stored in the first memory. The historical weather data may be utilized for training the weather prediction model to accurately predict the micro-weather for future time periods. Further, the weather prediction circuitry 120 (e.g., the weather prediction model) may be configured to receive the plurality of real-time weather parameters from the first set of sensors 112 and predict the micro-weather for the geographical region associated with the activity based on the plurality of real-time weather parameters and the historical weather data. The predicted micro-weather for the geographical region may indicate the presence of snow, rainfall, mist, dust, pollutants (e.g., carbon monoxide, sulfur dioxide, nitrogen oxide, ozone, lead, and particulate matter), or the like, in the geographical region at the future time period, the temperature, pressure, and humidity of the geographical region at the future time period, or the like.

The weather prediction model may be implemented in numerous ways. In an embodiment, the weather prediction model may be implemented based on a numerical weather prediction (NWP) model. The NWP model receives meteorological data from a variety of sources (e.g., radars, weather balloons, weather stations, or the like) and solves a set of mathematical equations to forecast future weather. Traditional NWP models are based on equations from computational physics and computer simulations. In another embodiment, the weather prediction model may be implemented based on a machine learning (ML) model. The ML model may preprocess the historical weather data to ensure the data is clean for analysis. The preprocessing may include normalizing, removing missing data attributes, rescaling data, or the like. For example, if an ML model does not support null values as input, null values from the dataset may be eliminated to ensure an ideal use case. Further, the ML model may be trained on the historical weather data to identify the best suitable parameters for weather prediction. Training the ML model involves feeding data which may consist of sample output data and a corresponding set of input parameters. Further, the ML model identifies bias and weights from the input parameters which may influence the output data and update itself to reach the desired accuracy. Indeed, a combination of one or more ML models and NWP models may also be used for predicting the micro-weather more accurately.

The topography generation circuitry 122 may include suitable logic, circuitry, and/or interfaces that may be configured to perform one or more operations. For example, the topography generation circuitry 122 may be configured to receive the plurality of real-time topographical parameters of the geographical region associated with the activity from the second set of sensors 114 via the communication network 110. The topography generation circuitry 122 may include a topographical map generation engine (not shown) and a second memory (not shown). The plurality of real-time topographical parameters may be stored in the second memory as a dataset. In an embodiment, the second memory may store historical topographical data associated with the geographical region. The historical topographical data may correspond to pre-existing or pre-documented data (e.g., geological maps, land survey data, satellite imagery, or the like) of the geographical region. Based on at least one of the plurality of real-time topographical parameters and the historical topographical data, the topography generation circuitry 122 may be further configured to generate a real topographical map of the geographical region. The real topographical map may thus be indicative of the real-time or near real-time topography of the geographical region. The real topographical map may be a two-dimensional (2D) map, a two-and-a-half dimensional (2.5D) map, or a three-dimensional (3D) map.

The topographical map generation engine may be configured to preprocess the dataset to remove noise and fill in primary gaps. Further, the topographical map generation engine may be configured to extract a plurality of attributes from the preprocessed dataset by employing a plurality of algorithms such as segmentation, edge detection, or the like. The plurality of attributes may include shapes, corners, edges, or the like. The topographical map generation engine may be further configured to use a plurality of techniques such as photogrammetry, stereo matching, structure from motion (SfM), or the like, to reconstruct the real topographical map using the extracted plurality of attributes. Additionally, the topographical map generation engine may refine the real topographical map by selectively removing unwanted elements, smoothing surfaces, filling in gaps, or the like. The real topographical map may be generated in a plurality of formats such as a standard triangle language or a standard tessellation language (STL) format, a film box (FBX) format, an object file (OBJ) format, or the like.

The topography generation circuitry 122 may be further configured to receive the predicted micro-weather of the geographical region for the future time period specified by the user 102 from the weather prediction circuitry 120. The topography generation circuitry 122 may be further configured to update the real topographical map based on the predicted micro-weather to generate a predicted topographical map of the geographical region for the future time period. The predicted topographical map is thus generated based on the real topographical map of the geographical region and the predicted micro-weather of the geographical region for the future time period. For example, the real topographical map may be generated during the spring season. However, the topography generation circuitry 122 may receive the predicted micro-weather indicating a rainy day and update the real topographical map to generate the predicted topographical map which reflects the rainy day.

The biodiversity avatar generation circuitry 124 may include suitable logic, circuitry, and/or interfaces that may be configured to perform one or more operations. For example, the biodiversity avatar generation circuitry 124 may be configured to receive the plurality of real-time biodiversity parameters of the plurality of biodiversity elements associated with the geographical region from the third set of sensors 116 via the communication network 110. Similarly, the biodiversity avatar generation circuitry 124 may be further configured to receive the predicted micro weather and the predicted topographical map of the geographical region from the weather prediction circuitry 120 and the topography generation circuitry 122, respectively. The biodiversity avatar generation circuitry 124 may be configured to predict a plurality of behavioral aspects of the plurality of biodiversity elements. The plurality of behavioral aspects indicates behavioral patterns and characteristics of the plurality of biodiversity elements. The biodiversity avatar generation circuitry 124 may be implemented based on a supervised ML model and trained on the detected plurality of real-time biodiversity parameters.

The biodiversity avatar generation circuitry 124 may include a third memory (not shown), a biodiversity prediction unit (not shown), and a first avatar generation unit (not shown). The plurality of real-time biodiversity parameters may be stored in the third memory. Additionally, the third memory may store historical biodiversity data of the plurality of biodiversity elements (e.g., migration patterns, population trends, hibernation, social behavior, or the like) received from a plurality of sources (such as online databases, wildlife conservation organizations, scientific journals, or the like). Alternatively, the biodiversity avatar generation circuitry 124 may include a Natural Language Processing (NLP) engine that ingests data associated with the plurality of biodiversity elements from articles, books, online databases, or the like. Further, the NLP engine stores the ingested data in the third memory. The biodiversity avatar generation circuitry 124 (e.g., the biodiversity prediction unit) may predict the plurality of behavioral aspects of the plurality of biodiversity elements associated with the geographical region based on at least one of the plurality of real-time biodiversity parameters of the plurality of biodiversity elements, the historical biodiversity data of the plurality of biodiversity elements, the predicted micro-weather of the geographical region for the future time period, and the predicted topographical map of the geographical region for the future time period.

The biodiversity avatar generation circuitry 124 (e.g., the biodiversity prediction unit) may be further configured to predict, based on the plurality of behavioral aspects of the plurality of biodiversity elements, one or more biodiversity elements of the plurality of biodiversity elements to be present in the geographical region at the future time period. The biodiversity avatar generation circuitry 124 (e.g., the first avatar generation unit) may be further configured to generate one or more biodiversity avatars of the one or more biodiversity elements of the plurality of biodiversity elements, respectively that are predicted to be present in the geographical region at the future time period, respectively. In an embodiment, the biodiversity avatar generation circuitry 124 may be configured to generate the one or more biodiversity avatars based on prior 3D scans and reference images that are stored in the third memory.

The weather simulation circuitry 126 may include suitable logic, circuitry, and/or interfaces that may be configured to perform one or more operations. For example, the weather simulation circuitry 126 may be configured to receive the predicted micro-weather from the weather prediction circuitry 120 and the predicted topographical map from the topography generation circuitry 122. The weather simulation circuitry 126 may be further configured to add, based on the predicted micro-weather, one or more dynamic elements to the predicted topographical map of the geographical region. The one or more dynamic elements may include strong winds, mild winds, rainfall, thundering sounds, mist, fog, snowfall, ocean currents, or the like. For example, when the predicted micro-weather for the future time period is indicative of a thunderstorm, the weather simulation circuitry 126 may add strong winds, thundering sounds, heavy rainfall, or the like, to the predicted topographical map. Additionally, the weather simulation circuitry 126 may be configured to allow the one or more dynamic elements to be interactive with the user 102, the one or more biodiversity avatars, and the predicted topographical map. For example, when the predicted micro-weather for the future time period is indicative of a snowstorm, the weather simulation circuitry 126 may be further configured to simulate a snowstorm environment. The snowstorm environment may include heavy snowfall, reduced visibility, icicles, snow-covered trees, snowdrifts, the amount of snow on the ground, or the like. Further, the animal avatars may be shown to include a coat of snow. Additionally, the effect of the snowstorm may be experienced greatly in an open area (say unsheltered or uncovered area) compared to an enclosed area (say under trees, inside a cave, or the like), thereby resulting in more snow in the first case as compared to the second.

The user avatar generation circuitry 128 may include suitable logic, circuitry, and/or interfaces that may be configured to perform one or more operations. For example, the user avatar generation circuitry 128 may be configured to receive the plurality of user parameters from the fourth set of sensors 118 via the communication network 110. The user avatar generation circuitry 128 may be further configured to generate a user avatar 132 based on the received plurality of user parameters. The user avatar 132 may be a 3D representation of the user 102. In an embodiment, the user avatar 132 may be configurable as per a user request. Examples of multiple configurations for the user avatar 132 may include different body shapes, facial hairs, hairstyles, or the like.

The user avatar generation circuitry 128 may be further configured to generate one or more accessory avatars associated with the user 102 and the activity. The one or more accessory avatars may correspond to a user outfit avatar, a vehicle avatar associated with the activity, an equipment avatar associated with the activity, or the like. For example, the user 102 may select additional equipment (such as bicycles, motorcycles, cars, carts, ropes, climbing harnesses, climbing shoes, belay devices, scuba gear, dive computers, diving lights, dive knives, snowboards, skiing equipment, rafts, sunglasses, watch, shoes, shirt, pants, or the like) by way of the metaverse client device 104 that may be used to perform the activity. The user avatar generation circuitry 128 generates an avatar of the selected equipment.

The metaverse generation circuitry 130 may include suitable logic, circuitry, interface, and/or code, executable by the circuitry, for generating the metaverse for the future scenario of the user 102 performing the desired activity. The metaverse generation circuitry 130 may be configured to receive the user input from the user 102 via the metaverse client device 104. Further, in response to the user input, the metaverse generation circuitry 130 may be configured to receive the predicted micro-weather and the predicted topographical map for the geographical region from the weather prediction circuitry 120 and the topography generation circuitry 122, respectively. Additionally, the metaverse generation circuitry 130 may be configured to receive the predicted topographical map with the one or more dynamic elements from the weather simulation circuitry 126. Further, the metaverse generation circuitry 130 may be configured to receive the plurality of behavioral aspects of the plurality of biodiversity elements and the one or more biodiversity avatars of the one or more biodiversity elements from the biodiversity avatar generation circuitry 124, and the user avatar 132 and the one or more accessory avatars from the user avatar generation circuitry 128.

The metaverse generation circuitry 130 may be further configured to generate the metaverse for the activity to be performed by the user 102 in the geographical region at the future time period specified by the user 102. The metaverse is thus generated in response to the user input. The metaverse is generated based on the predicted micro-weather of the geographical region for the future time period, the predicted topographical map of the geographical region for the future time period, and the plurality of behavioral aspects of the plurality of biodiversity elements predicted for the future time period. The generated metaverse thus includes the predicted topographical map of the geographical region, the one or more dynamic elements added to the predicted topographical map, the one or more biodiversity avatars of the one or more biodiversity elements, respectively that are predicted to be present in the geographical region at the future time period, the user avatar 132 of the user 102, and the one or more accessory avatars. In an exemplary scenario, on January 15, the user 102 selects the trail and specifies the future time period as January 16. The metaverse generation circuitry 130 may generate the metaverse for the activity to be performed by the user 102 in the trail as expected on January 16.

The metaverse generation circuitry 130 may be further configured to provide the generated metaverse to the metaverse client device 104 to enable the presentation of the metaverse to the user 102 via the metaverse client device 104. The metaverse is presented to the user 102 to enable the user 102 to immersively experience the activity that is to be performed at the future time period and make an informed decision about carrying out the activity. The immersive experience may enhance user engagement and improve decision-making for the user 102.

The weather prediction circuitry 120, the topography generation circuitry 122, the biodiversity avatar generation circuitry 124, the weather simulation circuitry 126, the user avatar generation circuitry 128, the metaverse generation circuitry 130, and the sensing circuitry 106 may be collectively referred to as a "metaverse system". However, the scope of the present disclosure is not limited to it. In various other embodiments, the metaverse system may correspond to exclusively the metaverse generation circuitry 130 or may additionally include one or more of the weather prediction circuitry 120, the topography generation circuitry 122, the biodiversity avatar generation circuitry 124, the weather simulation circuitry 126, the user avatar generation circuitry 128, and the sensing circuitry 106.

The aforementioned operations may be executed for the entire geographical region. However, the scope of the present disclosure is not limited to it. In various other embodiments, if the geographical region associated with the activity is substantially large, the geographical region may be divided into multiple segments and the aforementioned operations may be executed for each segment for creating the metaverse for the entire activity.

Although it is described that the user 102 specifies the details of the activity directly, the scope of the present disclosure is not limited to it. In various other embodiments, the user 102 may only specify the type of the activity and the future time period at which the user 102 intends to perform the activity. For each activity, the user 102 may have a plurality of options. For example, for hiking/cycling, the user 102 may have options of multiple trails to choose from. The user 102 may be presented with the plurality of options by way of the metaverse client device 104. The user 102 may select one option to experience the metaverse of the future scenario and may be presented with the metaverse of the selected option. In such cases, the sensing circuitry 106 may include additional sets of sensors, that operate similarly to the first through fourth sets of sensors 112-118 but for a different geographical region associated with the different option, and the metaverse server 108 may utilize the real-world data collected by these sets of sensors to create metaverse. Such a metaverse may be created if the user 102 selects the corresponding option. Thus, at any time instance, exclusively the metaverse of one option may be presented to the user 102.

Although it is described that the sensing circuitry 106 and the metaverse server 108 performs respective operations based on the future time period specified by the user 102, the scope of the present disclosure is not limited to it. In various other embodiments, the sensing circuitry 106 and the metaverse server 108 may perform respective operations for an upcoming duration (e.g., next hour, next day, or the like) and when the user 102 specifies the future time period, the corresponding data may be utilized for creating the metaverse of the user 102 performing the activity at the specified future time period.

The operations of the sensing circuitry 106 and the metaverse server 108 for different types of activity are explained in detail in conjunction with FIGS. 2-6. For example, the creation of the metaverse for the future scenario of the user 102 hiking/cycling a trail is explained in conjunction with FIGS. 2A-2D. Similarly, the creation of the metaverse for the future scenario of the user 102 climbing rocks is explained in conjunction with FIGS. 3A and 3B, whereas, the creation of the metaverse for the future scenario of the user 102 performing underwater exploration is explained in conjunction with FIGS. 4A-4D. Further, the creation of the metaverse for the future scenario of the user 102 skiing in a ski run is explained in conjunction with FIGS. 5A and 5B, and the creation of the metaverse for the future scenario of the user 102 visiting an event venue is explained in conjunction with FIGS. 6A-6D.

These scenarios are exemplary and the scope of the present disclosure is not limited to these. In other embodiments, the metaverse may be created for various other types of outdoor activity (such as star-gazing, sightseeing, or the like), without deviating from the scope of the present disclosure.

Hiking/Cycling a Trail:

FIGS. 2A-2D are diagrams that illustrate exemplary scenarios 200A-200D of the metaverse for the future scenario of hiking/cycling a trail from a user point-of-view (POV), in accordance with an embodiment of the present disclosure.

The exemplary scenarios 200A-200D are described in conjunction with the metaverse client device 104.

In one exemplary scenario, the user 102 may plan to go hiking/cycling on a trail and may wish to immersively experience the trail before deciding. A trail may refer to a designated or undesignated path in an outdoor environment such as a forest, a mountain, or the like. In such cases, the sensing circuitry 106 may collect or ingest real-world data of the trail for enabling a virtual simulation of the trail in the metaverse.

The first set of sensors 112 may detect the micro-weather of the trail (e.g., the geographical region encompassing the trail). In other words, the first set of sensors 112 may detect the plurality of real-time weather parameters of the trail. The plurality of real-time weather parameters of the trail may include temperature, pressure, dust particles, mist, allergens, pollutants, wind speed, wind direction, precipitation, humidity, solar radiation, presence of smoke, visibility, or the like. In such a scenario, the first set of sensors 112 may include temperature sensors, pressure sensors, dust particulate sensors, humidity sensors, strain sensors, smoke detector sensors, wind speed and direction sensors, precipitation and rain gauges, solar radiation sensors, visibility sensors, ceilometers, image sensors, or the like. The temperature sensors and the pressure sensors are used to measure the temperature and pressure of the trail at varying altitudes and distances, respectively. The dust particulate sensors detect the presence of dust particles along the trail. The humidity sensors are used to measure humidity along the trail and the smoke detector sensors are used to detect smoke particles (such as forest fire smoke) along the trail. The wind speed and direction sensors detect direction and speeds of wind along the trail and the precipitation and rain gauges measure rainfall levels along the trail. The solar radiation sensors measure solar radiation received along the trail to determine daylight hours and the visibility sensors measure the visibility along the trail during various weather conditions. The ceilometers estimate cloud heights along the trail and the image sensors capture images of the trail. The first set of sensors 112 thus detects various weather parameters that may be utilized to accurately predict the weather conditions of the trail at the future time period. Further, the first set of sensors 112 may transmit the detected plurality of real-time weather parameters to the weather prediction circuitry 120 of the metaverse server 108 via the communication network 110.

The weather prediction circuitry 120 predicts the micro-weather of the trail for the future time period specified by the user 102. The weather prediction model of the weather prediction circuitry 120 may be trained based on the historical weather data of various trails (including the trail to be explored by the user 102) and the trained weather prediction model predicts the micro-weather of the trail based on the plurality of real-time weather parameters received from the first set of sensors 112.

The second set of sensors 114 may detect the plurality of real-time topographical parameters of the trail. In case of the trail, the plurality of real-time topographical parameters may include cliffs, plateaus, plains, hills, rivers, lakes, depressions, elevations, ridges, or the like, and their characteristics such as height, width, length, thickness, depth, or the like. Thus, the second set of sensors 114 may include image sensors, LiDAR sensors, satellites, drones, radars, or the like. The image sensors and the LiDAR sensors may capture images and high-resolution 3D views of the trail, respectively. Additionally, the satellites and the drones may capture aerial images of the trail. Further, the radars may determine depressions and elevations in the trail. Two or more sensors of the second set of sensors 114 may operate in conjunction to detect the plurality of real-time topographical parameters of the trail. The second set of sensors 114 thus detects various topographical parameters that may be utilized to accurately generate the real topographical map of the trail. Further, the second set of sensors 114 may transmit the detected plurality of real-time topographical parameters to the topography generation circuitry 122 via the communication network 110.

The topography generation circuitry 122 generates the real topographical map of the trail that is to be explored by the user 102 based on at least one of the plurality of real-time topographical parameters and the historical topographical data of the trail. The topographical map generation engine of the topography generation circuitry 122 may generate the base layer of the real topographical map based on the historical topographical data associated with the trail. Further, the topographical map generation engine processes the plurality of real-time topographical parameters of the trail to generate the real topographical map of the trail. The topography generation circuitry 122 may also receive the predicted micro-weather of the trail for the future time period from the weather prediction circuitry 120 and update the real topographical map of the trail based on the predicted micro-weather to generate the predicted topographical map of the trail for the future time period.

The third set of sensors 116 may detect the plurality of real-time biodiversity parameters of the plurality of biodiversity elements along the trail. In case of the trail, the plurality of biodiversity elements includes animals, organisms, bird species, worms, plants, trees, grasses, or the like, present in the trail. The plurality of real-time biodiversity parameters includes the behavior pattern and the characteristics of the plurality of biodiversity elements. The behavior pattern includes migration, camouflage, hibernation, social behavior, foraging, adaptations, or the like, whereas, the characteristics include shape, color, size, sound, movement, or the like. Further, the third set of sensors 116 may transmit the detected plurality of real-time biodiversity parameters to the biodiversity avatar generation circuitry 124 via the communication network 110.

The biodiversity avatar generation circuitry 124 predicts the plurality of behavioral aspects of the plurality of biodiversity elements based on at least one of the plurality of real-time biodiversity parameters, the historical biodiversity data of the plurality of biodiversity elements, the predicted micro-weather of the trail for the future time period, and the predicted topographical map of the trail for the future time period. Further, the biodiversity avatar generation circuitry 124 predicts, based on the plurality of behavioral aspects of the plurality of biodiversity elements, the one or more biodiversity elements of the plurality of biodiversity elements to be present along the trail at the future time period. For example, when the predicted micro-weather indicates that there is a chance of light rains in the trail, the biodiversity avatar generation circuitry 124 may predict the presence of dancing peacocks in the trail. The biodiversity avatar generation circuitry 124 generates the one or more biodiversity avatars of the one or more biodiversity elements, respectively that are predicted to be present along the trail at the future time period. The one or more biodiversity avatars include avatars of animals, birds, insects, worms, plants, trees, grasses, or the like, predicted to be present in the trail at the future time period. In the aforementioned example, the biodiversity avatar generation circuitry 124 generates avatars of dancing peacocks.

The aforementioned weather, topographical, and biodiversity parameters and the associated types of sensors are exemplary and the scope of the present disclosure is not limited to these. In other embodiments, various other types of weather, topographical, and biodiversity parameters may be sensed by way of corresponding sensors, without deviating from the scope of the present disclosure.

The weather simulation circuitry 126 receives the predicted micro-weather from the weather prediction circuitry 120 and the predicted topographical map from the topography generation circuitry 122. The weather simulation circuitry 126 adds the one or more dynamic elements to the predicted topographical map of the trail based on the predicted micro-weather. The weather simulation circuitry 126 may allow the one or more dynamic elements to be interactive with the user 102, the one or more biodiversity avatars, and the predicted topographical map. For example, when the predicted micro-weather for the future time period is indicative of a cloudy day, the weather simulation circuitry 126 may simulate a cloudy day environment. The cloudy day environment may include mild winds, clouds, humidity, or the like. In an embodiment, the sensing circuitry 106 may additionally include a fifth set of sensors (not shown) configured to detect a plurality of sky elements along the trail. The plurality of sky elements may include stars, sun, moon, comets, polar lights, rainbows, or the like, and their occurrence pattern. The fifth set of sensors may include telescopes, cameras, satellites, or the like. Further, the weather simulation circuitry 126 may be configured to generate the one or more dynamic elements based on the predicted micro-weather and the detected plurality of sky elements. In this case, the one or more dynamic elements may include star avatars, sun avatar, moon avatar, comet avatars, avatars of polar lights, rainbow avatars, or the like.

The fourth set of sensors 118 may detect the plurality of user parameters. Further, the user avatar generation circuitry 128 may receive the plurality of user parameters from the fourth set of sensors 118 via the communication network 110 and generate the user avatar 132. The user avatar generation circuitry 128 further generates the one or more accessory avatars associated with the user 102 and the activity. For example, the user 102 may select a mode of travel to explore the trail from a plurality of options (such as walk, animal ride, bike ride, car ride, or the like) presented through the metaverse client device 104. The user avatar generation circuitry 128 generates an avatar of a bike when the selected mode of travel is bike ride.

The metaverse generation circuitry 130 generates the metaverse for the future scenario of the user 102 exploring the trail at the future time period. The metaverse generation circuitry 130 generates the metaverse based on the predicted micro-weather of the trail, the predicted topographical map of the trail, and the plurality of behavioral aspects of the plurality of biodiversity elements predicted for the future time period. Further, the generated metaverse includes the predicted topographical map of the trail, the one or more dynamic elements added to the predicted topographical map, the one or more biodiversity avatars of the one or more biodiversity elements, respectively that are predicted to be present in the trail at the future time period, the user avatar 132 of the user 102, and the one or more accessory avatars. The generated metaverse is presented to the user 102 by way of the metaverse client device 104.

Figure 2A:
FIGS. 2A-2D are diagrams that illustrate exemplary scenarios of the metaverse for the future scenario of hiking/cycling a trail from a user point-of-view (POV), in accordance with an embodiment of the present disclosure.

Now referring to FIG. 2A, in the exemplary scenario 200A, the user 102 is presented with the metaverse of the trail. As shown in FIG. 2A, the metaverse includes the user avatar 132, a deer avatar 202, a first bird avatar 204a, a second bird avatar 204b, and a third bird avatar 204c. The deer avatar 202 and the first through third bird avatars 204a, 204b, and 204c corresponds to the avatars of the one or more biodiversity elements, respectively that are predicted to be present in the trail at the future time period. The metaverse of the trail may be created such that the user 102 may experience hiking the trail via the metaverse client device 104 in 2-D, 3-D, or 2.5D options.

Figure 2B:

Referring to FIG. 2B, in the exemplary scenario 200B, the user avatar 132 moves along the trail. Thus, the positions of the avatars change. The metaverse client device 104 may be configured to allow the user 102 to visualize the trail based on user actions. For example, the user 102 may view the trail differently while moving at different walking speeds. The user 102 may interact with the birds in the vicinity of the trail. In an exemplary scenario, when the user avatar 132 approaches the first bird avatar 204a in the metaverse of the trail, the first bird avatar 204a may fly away. In an embodiment, the user avatar 132 reaches the end of the trail and the user 102 enjoys star gazing on top of a hill. The user 102 may view the star avatars and the comet avatars. In another embodiment, when the trail is at one of the north pole and south pole, the metaverse may include the avatars of polar lights.

FIGS. 2A and 2B illustrate scenarios where the user 102 is hiking/cycling the trail. However, in other embodiments, the user 102 may use a vehicle to travel through the trail. The metaverse of such a scenario is illustrated in FIGS. 2C and 2D.

Figure 2C:

Referring to FIG. 2C, in the exemplary scenario 200C, the user 102 explores the trail on a bike. the metaverse client device 104 may be configured to simulate the experience of the user 102 exploring the trail while on a bike avatar 206.

Figure 2D:
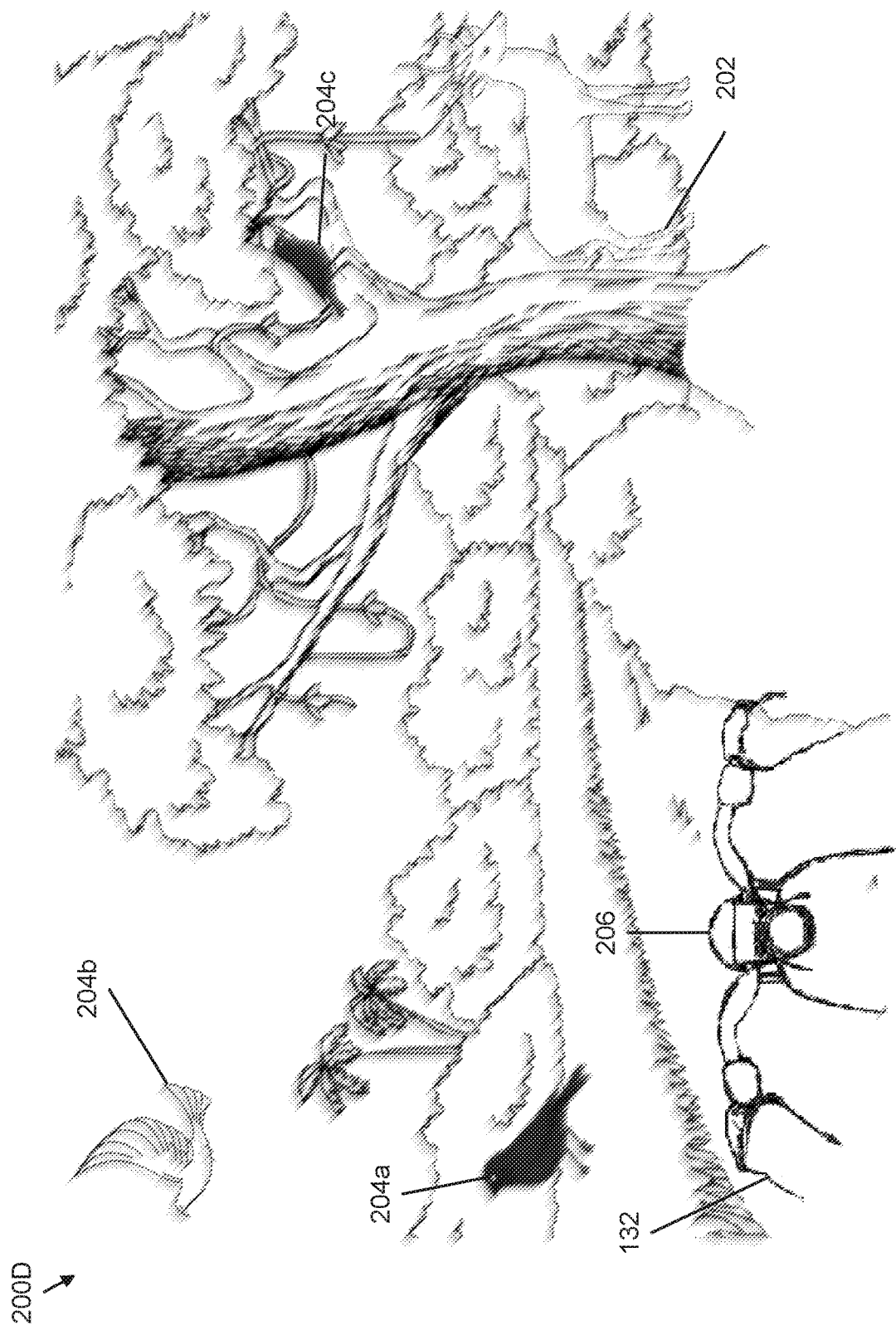

Referring to FIG. 2D, in the exemplary scenario 200D, the user avatar 132 moves from one point to another along the trail on the bike avatar 206. the metaverse client device 104 may allow the user 102 to visualize the trail based on the speed of the bike avatar 206. For example, the user 102 may view the trail differently while traveling at different speeds.

The user 102 may thus immersively experience how the activity is likely to pan out at the specified future time period and make an informed decision accordingly. In a scenario, when the user 102 is prone to dust allergy and the metaverse of the trail indicates the presence of dust particles along the trail, the user 102 may decide to cancel the plan to go hiking on the trail. In another scenario, when the metaverse of the trail indicates the presence of Cinnamon Teal (a migratory bird) in the trail, the user 102 may decide to go hiking on the trail.

The metaverse illustrated in each of FIGS. 2A-2D may additionally include various other elements (such as trees, plants, pathways, stones, or the like) which are not labeled in FIGS. 2A-2D so as to not obscure the drawings.

Figure 3A:
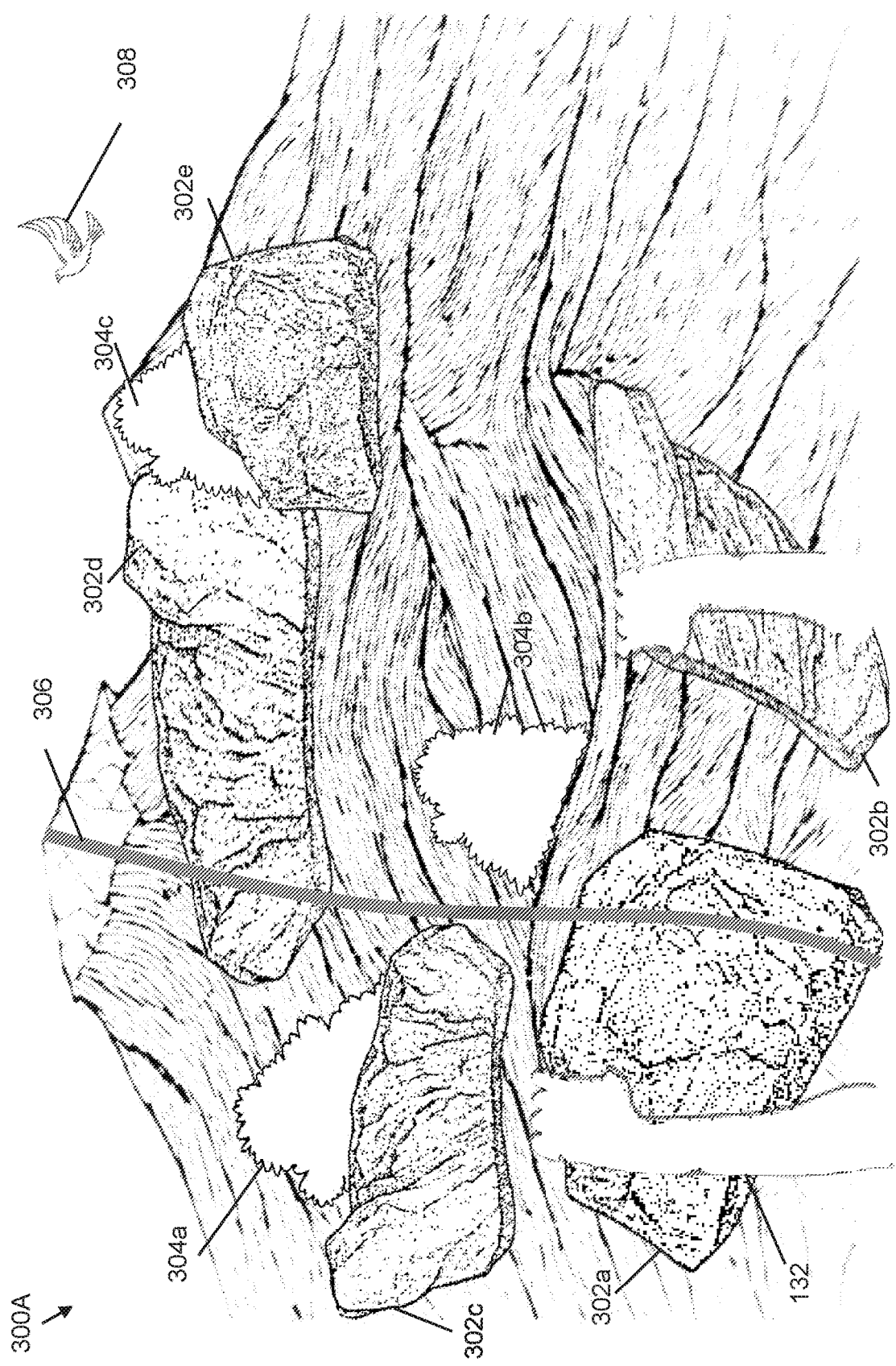
FIGS. 3A and 3B are diagrams that illustrate exemplary scenarios of the metaverse for the future scenario of rock climbing from the user POV, in accordance with an embodiment of the present disclosure.
Figure 3B:
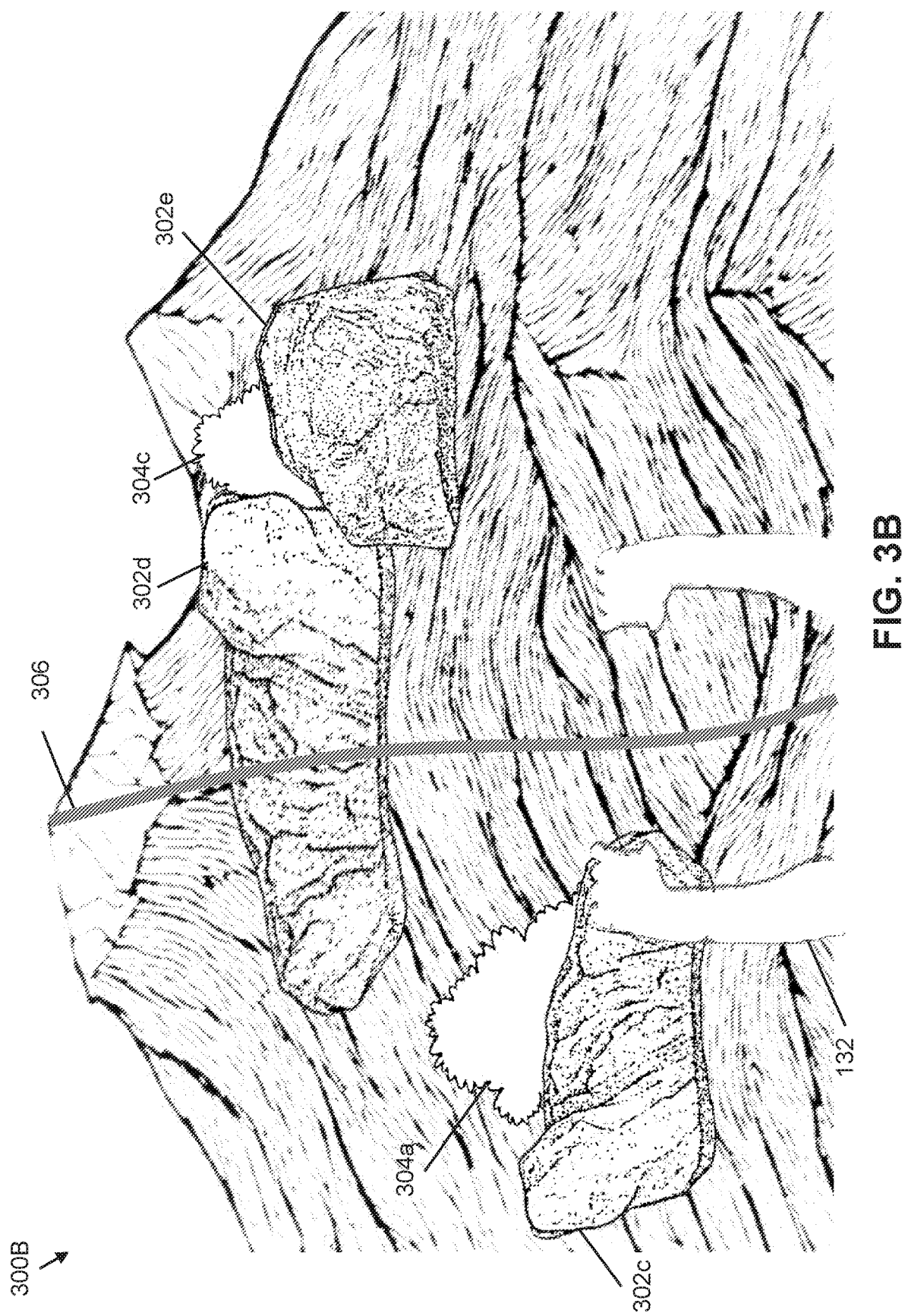

Rock Climbing:

FIGS. 3A and 3B are diagrams that illustrate exemplary scenarios 300A and 300B of the metaverse for the future scenario of rock climbing from the user POV, in accordance with an embodiment of the present disclosure. The exemplary scenarios 300A and 300B are described in conjunction with the metaverse client device 104.

In an exemplary scenario, the user 102 may be planning to go rock climbing on the rock climbing route and may wish to immersively experience the rock climbing route before deciding. A rock climbing route may refer to a path to be followed to reach the top of a mountain. In such cases, the sensing circuitry 106 may collect or ingest real-world data of the rock climbing route for enabling a virtual simulation of the rock climbing route in the metaverse.

The first set of sensors 112 may detect the micro-weather of the rock climbing route (e.g., the geographical region encompassing the rock climbing route). In other words, the first set of sensors 112 may detect the plurality of real-time weather parameters of the rock climbing route. In case of the rock climbing route, the plurality of real-time weather parameters may include temperature, pressure, dust particles, mist, fog, allergens, pollutants, wind speed, wind direction, precipitation, humidity, solar radiation, presence of smoke, visibility, or the like. In such a scenario, the first set of sensors 112 may include temperature sensors, pressure sensors, dust particulate sensors, vibration sensors, humidity sensors, smoke detector sensors, wind speed and direction sensors, precipitation and rain gauges, solar radiation sensors, visibility sensors, ceilometers, and image sensors, that measure/detect the temperature, the atmospheric pressure, the dust particles, the vibrations, the humidity, the smoke particles (such as forest fire smoke), the direction and speeds of wind, the rainfall, the solar radiation, the visibility, the cloud heights, and images along the rock climbing route, respectively. Further, the first set of sensors 112 may transmit the detected plurality of real-time weather parameters to the weather prediction circuitry 120 via the communication network 110.

The weather prediction circuitry 120 predicts the micro-weather of the rock climbing route for the future time period specified by the user 102. The weather prediction model of the weather prediction circuitry 120 may be trained based on the historical weather data of various rock climbing routes (including the rock climbing route to be explored by the user 102) and the trained weather prediction model may predict the micro-weather of the rock climbing route based on the plurality of real-time weather parameters received from the first set of sensors 112.

The second set of sensors 114 may detect the plurality of real-time topographical parameters of the rock climbing route. In case of the rock climbing route, the plurality of real-time topographical parameters may include cliffs, plateaus, ridges, depressions, contours, elevations, or the like, and their characteristics such as height, width, length, thickness, depth, or the like. Thus, the second set of sensors 114 may include image sensors, LiDAR sensors, ultrasonic sensors, GPS sensors, satellites, drones, radars, sonars, or the like. Two or more sensors of the second set of sensors 114 may operate in conjunction to detect the plurality of real-time topographical parameters of the rock climbing route. The second set of sensors 114 thus detects various topographical parameters that may be utilized to accurately generate the real topographical map of the rock climbing route. Further, the second set of sensors 114 may transmit the detected plurality of real-time topographical parameters to the topography generation circuitry 122 via the communication network 110.

The topography generation circuitry 122 generates the real topographical map of the rock climbing route that is to be explored by the user 102 based on at least one of the plurality of real-time topographical parameters and the historical topographical data of the rock climbing route. The topography generation circuitry 122 may also receive the predicted micro-weather of the rock climbing route for the future time period from the weather prediction circuitry 120. Further, the topography generation circuitry 122 updates the real topographical map of the rock climbing route based on the predicted micro-weather to generate the predicted topographical map of the rock climbing route for the future time period. In an example, when the predicted micro-weather indicates that there is a chance of rainfall at the future time period specified by the user 102, depressions in the rock climbing route are filled with rainwater in the predicted topographical map of the rock climbing route.

The third set of sensors 116 may detect the plurality of real-time biodiversity parameters of the plurality of biodiversity elements along the rock climbing route. In case of the rock climbing route, the plurality of biodiversity elements includes different animals, organisms, bird species, worms, plants, trees, grasses, bushes, mosses, or the like, present along the rock climbing route. The plurality of real-time biodiversity parameters includes the behavior pattern and the characteristics of the plurality of biodiversity elements. The behavior pattern includes migration, camouflage, hibernation, social behavior, foraging, adaptations, or the like, whereas, the characteristics include shape, color, size, sound, movement, or the like. Further, the third set of sensors 116 may transmit the detected plurality of real-time biodiversity parameters to the biodiversity avatar generation circuitry 124 via the communication network 110.

The biodiversity avatar generation circuitry 124 predicts the plurality of behavioral aspects of the plurality of biodiversity elements based on at least one of the plurality of real-time biodiversity parameters, the historical biodiversity data of the plurality of biodiversity elements, the predicted micro-weather of the rock-climbing route for the future time period, and the predicted topographical map of the rock-climbing route for the future time period. The biodiversity avatar generation circuitry 124 further predicts, based on the plurality of behavioral aspects of the plurality of biodiversity elements, the one or more biodiversity elements of the plurality of biodiversity elements to be present along the rock-climbing route at the future time period. For example, when the predicted micro-weather indicates that there is a chance of heavy rainfall in the rock climbing route, the biodiversity avatar generation circuitry 124 predicts that there are no birds visible in the rock climbing route. The biodiversity avatar generation circuitry 124 may further generate the one or more biodiversity avatars of the one or more biodiversity elements, respectively that are predicted to be present along the rock-climbing route at the future time period. The one or more biodiversity avatars include avatars of animals, birds, insects, worms, plants, trees, grasses, bushes, mosses, or the like, predicted to be present along the rock climbing route at the future time period.

The aforementioned weather, topographical, and biodiversity parameters and the associated types of sensors are exemplary and the scope of the present disclosure is not limited to these. In other embodiments, various other types of weather, topographical, and biodiversity parameters may be sensed by way of corresponding sensors, without deviating from the scope of the present disclosure.

The weather simulation circuitry 126 receives the predicted micro-weather from the weather prediction circuitry 120 and the predicted topographical map from the topography generation circuitry 122. The weather simulation circuitry 126 adds the one or more dynamic elements to the predicted topographical map of the rock climbing route. In one example, when the predicted micro-weather for the future time period is indicative of a thunderstorm, the weather simulation circuitry 126 may add strong winds, thundering sounds, heavy rainfall, or the like, to the predicted topographical map. In another example, when the predicted micro-weather for the future time period is indicative of a sunny day, the weather simulation circuitry 126 may simulate a sunny day environment. The sunny day environment may include bright sunlight, clear sky, dust particles in the atmosphere, or the like. Additionally, the weather simulation circuitry 126 may allow the one or more dynamic elements to be interactive with the user 102, the one or more biodiversity avatars, and the predicted topographical map.

The fourth set of sensors 118 may detect the plurality of user parameters. Further, the user avatar generation circuitry 128 receives the plurality of user parameters from the fourth set of sensors 118 via the communication network 110 and generates the user avatar 132. The user avatar generation circuitry 128 further generates one or more accessory avatars associated with the user 102 and the activity. For example, the user 102 may select a mode of rock climbing from a plurality of rock climbing modes (such as bouldering, scrambling, top roping, traditional climbing, or the like) presented through the metaverse client device 104. The user avatar generation circuitry 128 may further generate equipment avatars for the equipment associated with the selected mode of rock climbing. The one or more accessory avatars include avatars of ropes, climbing harnesses, climbing shoes, and a belay device when the selected mode of climbing is top roping.

The metaverse generation circuitry 130 generates the metaverse for the future scenario of the user 102 performing rock climbing in the rock climbing route at the future time period specified by the user 102. The metaverse generation circuitry 130 generates the metaverse for the future scenario of the user 102 climbing through the rock climbing route based on the predicted micro-weather of the rock climbing route, the predicted topographical map of the rock climbing route, and the plurality of behavioral aspects of the plurality of biodiversity elements predicted for the future time period. Further, the generated metaverse includes the predicted topographical map of the rock climbing route, the one or more dynamic elements added to the predicted topographical map, the one or more biodiversity avatars of the one or more biodiversity elements, the user avatar 132 of the user 102, and the one or more accessory avatars. The generated metaverse is presented to the user 102 by way of the metaverse client device 104.

Now referring to FIG. 3A, in the exemplary scenario 300A, the user 102 is presented with the metaverse of how the rock climbing route would appear at the future time period specified by the user 102. As shown in FIG. 3A, the metaverse of the rock climbing route includes the user avatar 132, a first rock avatar 302a, a second rock avatar 302b, a third rock avatar 302c, a fourth rock avatar 302d, a fifth rock avatar 302e, a first bush avatar 304a, a second bush avatar 304b, a third bush avatar 304c, a rope avatar 306, a fourth bird avatar 308a, mosses grown on the first rock avatar 302a and the second rock avatar 302b (not shown), and fog element (not shown). The metaverse of the rock climbing route may be created such that the user 102 may experience the rock climbing route via the metaverse client device 104 in 2-D, 3-D, or 2.5D options.

Referring to FIG. 3B, in the exemplary scenario 300B, the user avatar 132 climbs through the rock climbing route. Thus, the positions of the avatars change. The metaverse client device 104 may be configured to allow the user 102 to visualize the rock climbing route based on user actions. For example, the user 102 may view the rock climbing route differently while climbing at different speeds. When the user avatar 132 ascends towards the top of the rock climbing route, the user avatar 132 may step on the mosses grown on the first rock avatar 302a and the second rock avatar 302b. As a result, the user avatar 132 may slip down. The user 102 may experience the slip through the metaverse client device 104. Further, as the user avatar 132 ascends towards the top of the rock climbing route, the user 102 may experience strong winds through the metaverse client device 104. In an example, the user avatar 132 may pause and look at the view. In an embodiment, the user 102 may experience the temperature and humidity predicted by the weather prediction circuitry 120 through the metaverse client device 104.

In an example, when the user avatar 132 tries to reach and hold the third rock avatar 302c, the third rock avatar 302c may slide down due to loosened soil. As a result, the user avatar 132 may be injured.

The user 102 may thus immersively experience how the rock climbing activity is likely to pan out at the specified future time period and make an informed decision accordingly. In a scenario, when the metaverse of the rock climbing route indicates the presence of mosses grown on the rocks, the user 102 may decide not to go for rock climbing in the rock climbing route. In another scenario, when the user 102 experiences rock climbing without encountering any slippery rocks and sliding of rocks in the metaverse, the user 102 may decide to take up rock climbing.

The metaverse illustrated in each of FIGS. 3A and 3B may additionally include various other elements (such as rocks, bushes, or the like) which are not labeled in FIGS. 3A and 3B so as to not obscure the drawings.

Underwater Activity:

FIGS. 4A-4D are diagrams that illustrate exemplary scenarios 400A-400D of the metaverse for the future scenario of an underwater activity from the user POV, in accordance with an embodiment of the present disclosure. The exemplary scenarios 400A-400D are described in conjunction with the metaverse client device 104.

In an exemplary scenario, the user 102 may plan to go for underwater exploration in a water body and may wish to immersively experience the underwater activity before deciding. The water body may be one of sea, ocean, river, lake, gulf, bay, or the like. Examples of the underwater activity include diving, snorkeling, underwater photography, exploring marine life in a submarine, and the like. In such cases, the sensing circuitry 106 may collect or ingest real-world data of the water body for enabling a virtual simulation of the underwater activity in the metaverse.

The first set of sensors 112 may detect the micro-weather of the water body (e.g., the geographical region encompassing the water body). In other words, the first set of sensors 112 may detect the plurality of real-time weather parameters of the water body. In case of the water body, the plurality of real-time weather parameters may include temperature, pressure, wave attributes, visibility, water temperature, wind speed, wind direction, precipitation, solar radiation, visibility, salinity, Coriolis force, and the like. In such a scenario, the first set of sensors 112 may include temperature sensors, pressure sensors, vibration sensors, oxygen sensors, humidity sensors, wind speed and direction sensors, precipitation and rain gauges, solar radiation sensors, visibility sensors, image sensors, salinity sensors, Coriolis flow meters, and the like.

The temperature sensors measure the temperature of the water body and the pressure sensors measure pressure at various depths of the water body. Further, the vibration sensors measure vibrations along the water body for seismic activity and the oxygen sensors measure oxygen levels along the depths of the water body. Additionally, the humidity sensors measure humidity levels at the surface of the water body. Further, the wind speed and direction sensors detect direction and speeds of wind along the water body and the precipitation and rain gauges measure rainfall at the water body. Additionally, the solar radiation sensors measure solar radiation in the water body and the visibility sensors measure the visibility along the depth of the water body. Further, the ceilometers estimate cloud heights at the water body and the image sensors capture underwater images of the water body. Additionally, the salinity sensors measure salinity of the water body and the Coriolis flow meters measure the Coriolis force exerted by flowing fluid in the water body. Further, the first set of sensors 112 may transmit the detected plurality of real-time weather parameters to the weather prediction circuitry 120.

The weather prediction circuitry 120 predicts the micro-weather of the water body for the future time period specified by the user 102. The weather prediction model of the weather prediction circuitry 120 may be trained based on the historical weather data of various water bodies (including the water body to be explored by the user 102). The trained weather prediction model predicts the micro-weather of the water body based on the plurality of real-time weather parameters received from the first set of sensors 112. In an embodiment, the first memory may store historic ocean current data. Ocean currents may be caused by wind, density differences in water masses due to temperature and salinity variations, gravity, and events such as earthquakes or storms. Currents are cohesive streams of seawater that circulate through the ocean. Further, the weather prediction circuitry 120 may predict the occurrence of ocean currents in the water body based on the historic ocean current data and the plurality of real-time weather parameters.

The second set of sensors 114 may detect the plurality of real-time topographical parameters of the water body. In case of the water body, the plurality of real-time topographical parameters may include ocean ridges, continental shelves, trenches, sea canyons, corals, depths, or the like, and their characteristics such as height, width, length, thickness, depth, or the like. Thus, the second set of sensors 114 may include image sensors, LiDAR sensors, ultrasonic sensors, radars, satellites, drones, or the like. The image sensors capture images of the water body and the LiDAR sensors capture a high-resolution 3D view of the water body. Further, the ultrasonic sensors and the radars measure the depth of the water body using sound waves and electromagnetic waves, respectively. Additionally, the satellites and the drones may capture aerial images of the water body. Two or more sensors of the second set of sensors 114 may operate in conjunction to detect the plurality of real-time topographical parameters of the water body. The second set of sensors 114 thus detects various topographical parameters that may be utilized to accurately generate the real topographical map of the water body. Further, the second set of sensors 114 may transmit the detected plurality of real-time topographical parameters to the topography generation circuitry 122 via the communication network 110.

The topography generation circuitry 122 generates the real topographical map of the water body based on at least one of the plurality of real-time topographical parameters and the historical topographical data of the water body. The topography generation circuitry 122 may also receive the predicted micro-weather of the water body from the weather prediction circuitry 120 and update the real topographical map of the water body based on the predicted micro-weather to generate the predicted topographical map of the water body for the future time period.

The third set of sensors 116 may detect the plurality of real-time biodiversity parameters of the plurality of biodiversity elements in the water body. In case of the water body, the plurality of biodiversity elements includes different mammals, turtles, fish species, seaweed, seagrass, or the like, present in the water body. The plurality of real-time biodiversity parameters includes the behavior pattern and the characteristics of the plurality of biodiversity elements. Further, the third set of sensors 116 may transmit the detected plurality of real-time biodiversity parameters to the biodiversity avatar generation circuitry 124 via the communication network 110.

The biodiversity avatar generation circuitry 124 predicts the plurality of behavioral aspects of the plurality of biodiversity elements based on at least one of the plurality of real-time biodiversity parameters, the historical biodiversity data of the plurality of biodiversity elements, the predicted micro-weather of the water body for the future time period, and the predicted topographical map of the water body for the future time period. The biodiversity avatar generation circuitry 124 further predicts, based on the plurality of behavioral aspects of the plurality of biodiversity elements, the one or more biodiversity elements of the plurality of biodiversity elements to be present in the water body at the future time period. In an example, the biodiversity avatar generation circuitry 124 predicts the presence of leatherback sea turtles in the water body based on the plurality of real-time biodiversity parameters and predicted micro-weather. In another example, the biodiversity avatar generation circuitry 124 predicts the presence of humpback whales based on the migration pattern of the humpback whales. In yet another example, when the predicted micro-weather indicates the occurrence of ocean current in the water body, the biodiversity avatar generation circuitry 124 may predict the presence of migratory sharks in the water body. The biodiversity avatar generation circuitry 124 may further generate the one or more biodiversity avatars of the one or more biodiversity elements, respectively that are predicted to be present in the water body. The one or more biodiversity avatars may include avatars of mammals, turtles, fish species, seaweed, seagrass, or the like predicted to be present in the water body at the future time period.

The aforementioned weather, topographical, and biodiversity parameters and the associated types of sensors are exemplary and the scope of the present disclosure is not limited to these. In other embodiments, various other types of weather, topographical, and biodiversity parameters may be sensed by way of corresponding sensors, without deviating from the scope of the present disclosure.

The weather simulation circuitry 126 receives the predicted micro-weather from the weather prediction circuitry 120 and the predicted topographical map from the topography generation circuitry 122. The weather simulation circuitry 126 adds the one or more dynamic elements to the predicted topographical map of the water body. For example, when the predicted micro-weather for the time period is indicative of a cyclone, the one or more dynamic elements include strong winds, thundering sounds, heavy rainfall, harsh ocean currents, and the like. Additionally, the weather simulation circuitry 126 may allow the one or more dynamic elements to be interactive with the user 102, the one or more biodiversity avatars, and the predicted topographical map.

The fourth set of sensors 118 may detect the plurality of user parameters. Further, the user avatar generation circuitry 128 may receive the plurality of user parameters from the fourth set of sensors 118 via the communication network 110 and generate the user avatar 132. The user avatar generation circuitry 128 further generates the one or more accessory avatars associated with the user 102 and the activity. In an example, when the underwater activity planned by the user 102 is diving, the user 102 may select a diving suit from a plurality of diving suits (such as dive skins, wetsuits, semi-dry suits, dry suits, hot water suits, or the like) that may be used for diving and presented through the metaverse client device 104. The user avatar generation circuitry 128 may be further configured to generate an avatar of the selected diving suit. The user avatar generation circuitry 128 may be further configured to generate avatars of gears that are to be utilized during diving. The one or more accessory avatars include avatars of dive computers, scuba gear, diving lights, dive knives, and the like.

The metaverse generation circuitry 130 generates the metaverse for the future scenario of the user 102 performing underwater activity in the water body at the future time period specified by the user 102. The metaverse generation circuitry 130 generates the metaverse for the future scenario of the user 102 exploring the water body based on the predicted micro-weather of the water body, the predicted topographical map of the water body, and the plurality of behavioral aspects of the plurality of biodiversity elements predicted for the future time period. Further, the generated metaverse includes the predicted topographical map of the water body, the one or more dynamic elements added to the predicted topographical map, the one or more biodiversity avatars of the one or more biodiversity elements, the user avatar 132 of the user 102, and the one or more accessory avatars. The generated metaverse may be presented to the user 102 by way of the metaverse client device 104

Figure 4A:
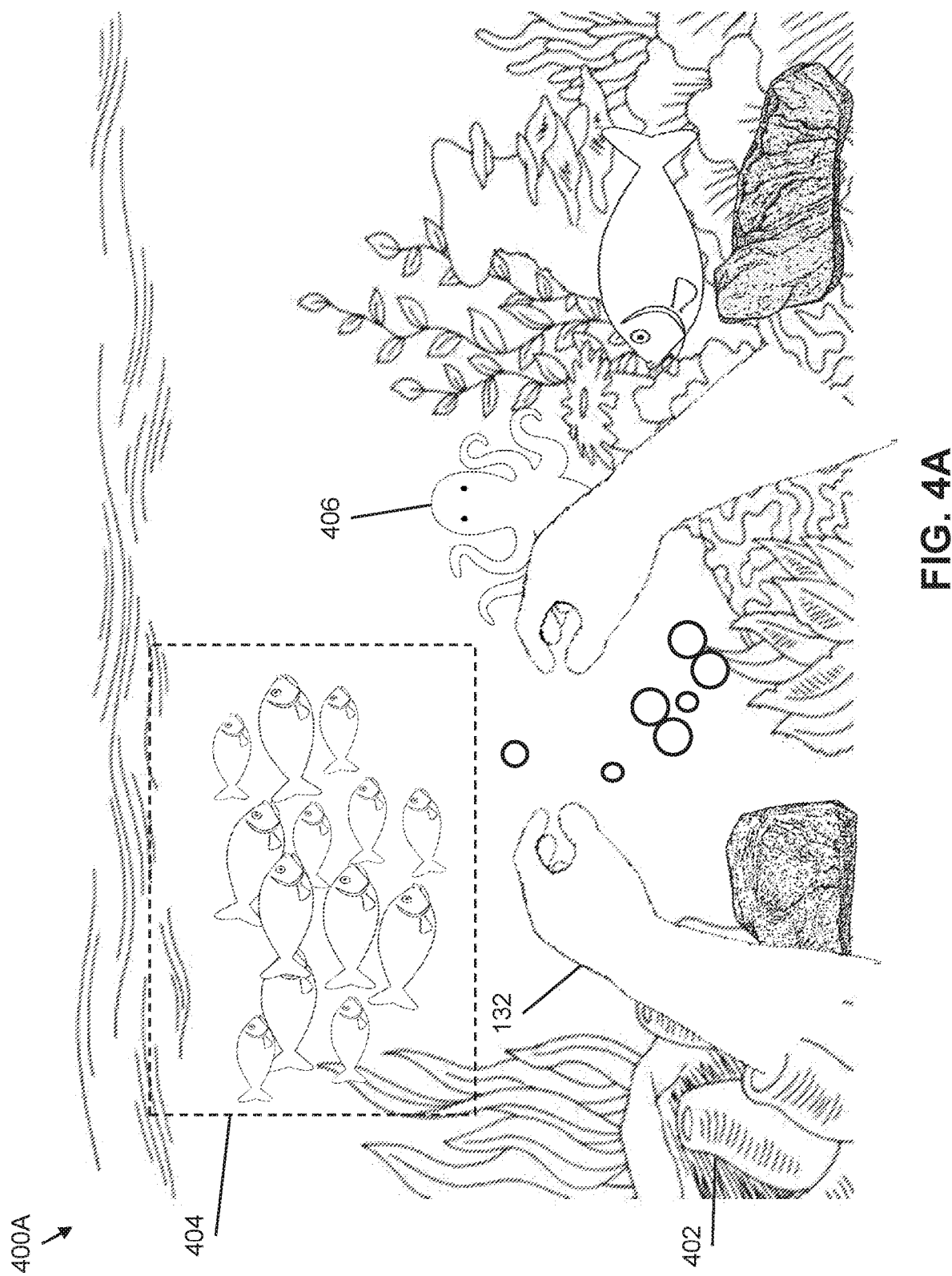
FIGS. 4A-4D are diagrams that illustrate exemplary scenarios of the metaverse for the future scenario of an underwater activity from the user POV, in accordance with an embodiment of the present disclosure.

Now referring to FIG. 4A, in the exemplary scenario 400A, the user 102 is presented with the metaverse of how a diving point would appear at the future time period specified by the user 102. The diving point may refer to a location where the user 102 is interested to explore a plurality of aquatic elements (such as aquatic life, ocean currents, coral reefs, or the like). As shown in FIG. 4A, the metaverse of the diving point includes the user avatar 132 of the user 102, a sea sponge avatar 402, a plurality of fish avatars 404, and a first octopus avatar 406. The metaverse of the diving point may be created such that the user 102 may experience the diving point via the metaverse client device 104 in 2-D, 3-D, or 2.5D options.

Figure 4B:
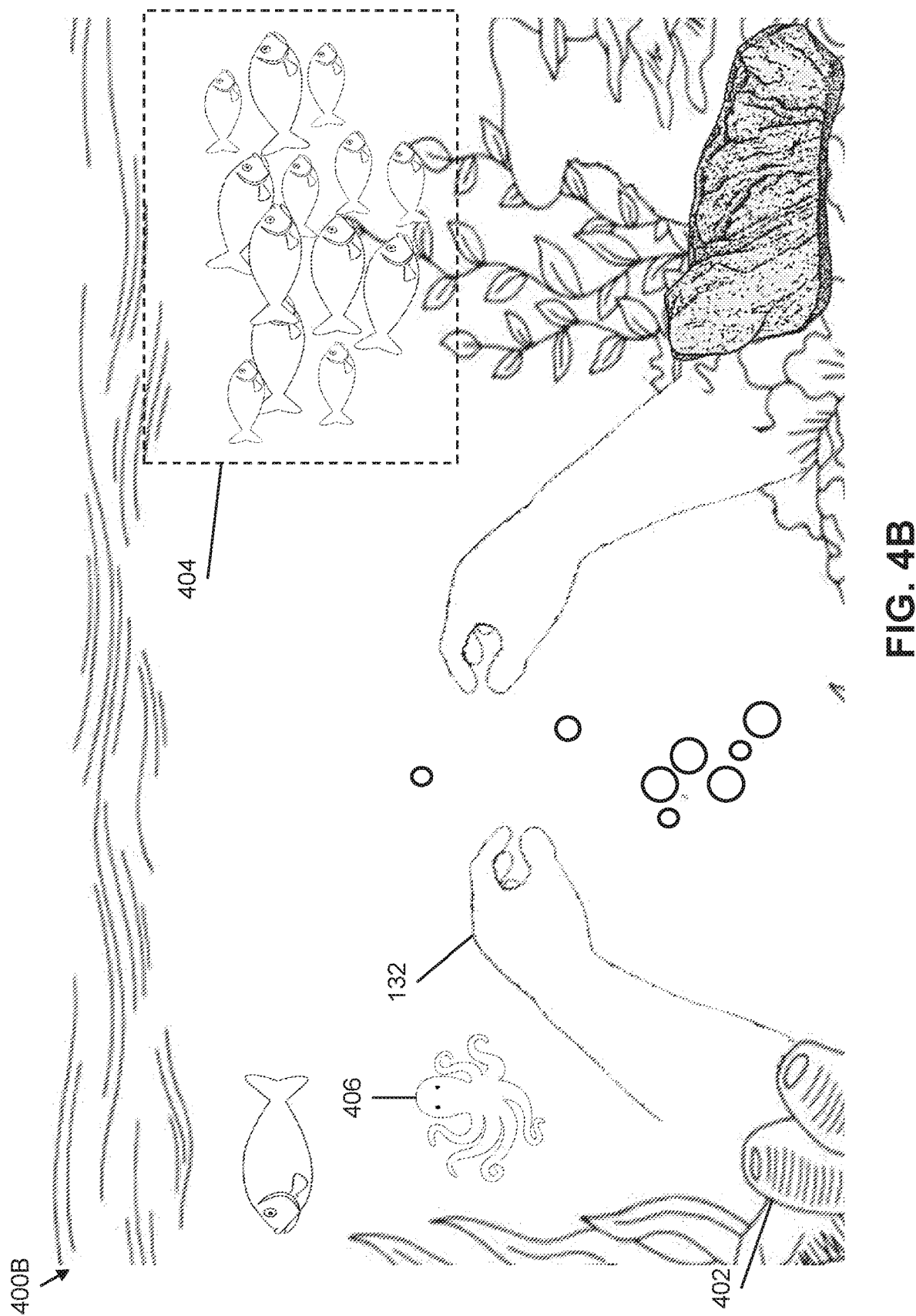

Referring to FIG. 4B, in the exemplary scenario 400B, the user avatar 132 proceeds through the diving point. Thus, the positions of the avatars change. The metaverse client device 104 may be configured to allow the user 102 to visualize the diving point based on user actions. For example, the user 102 may view the diving point differently while diving at different speeds. The plurality of fish avatars 404 and the first octopus avatar 406 swim away as the user avatar 132 proceeds through the water body. In an example, the user avatar 132 may interact with the plurality of fish avatars 404 in the vicinity of the diving point. When the user avatar 132 approaches the plurality of fish avatars 404 in the metaverse of the diving point, the plurality of fish avatars 404 may swim away.

Although it is described that the metaverse is generated for diving in the diving point, the scope of the present disclosure is not limited to it. In an embodiment, the metaverse may be generated for various aquatic ecosystems such as lakes, ponds, rivers, oceans, streams, intertidal zone, reefs, seabed, or the like for various activities such as boating, swimming, fishing, snorkeling, or the like, without deviating from the scope of the present disclosure.

FIGS. 4A and 4B illustrate scenarios where the user 102 is diving in the diving point. However, in other embodiments, the user 102 may go for underwater marine life exploration in a submarine. The metaverse of such a scenario is illustrated in FIGS. 4C and 4D.

Figure 4C:
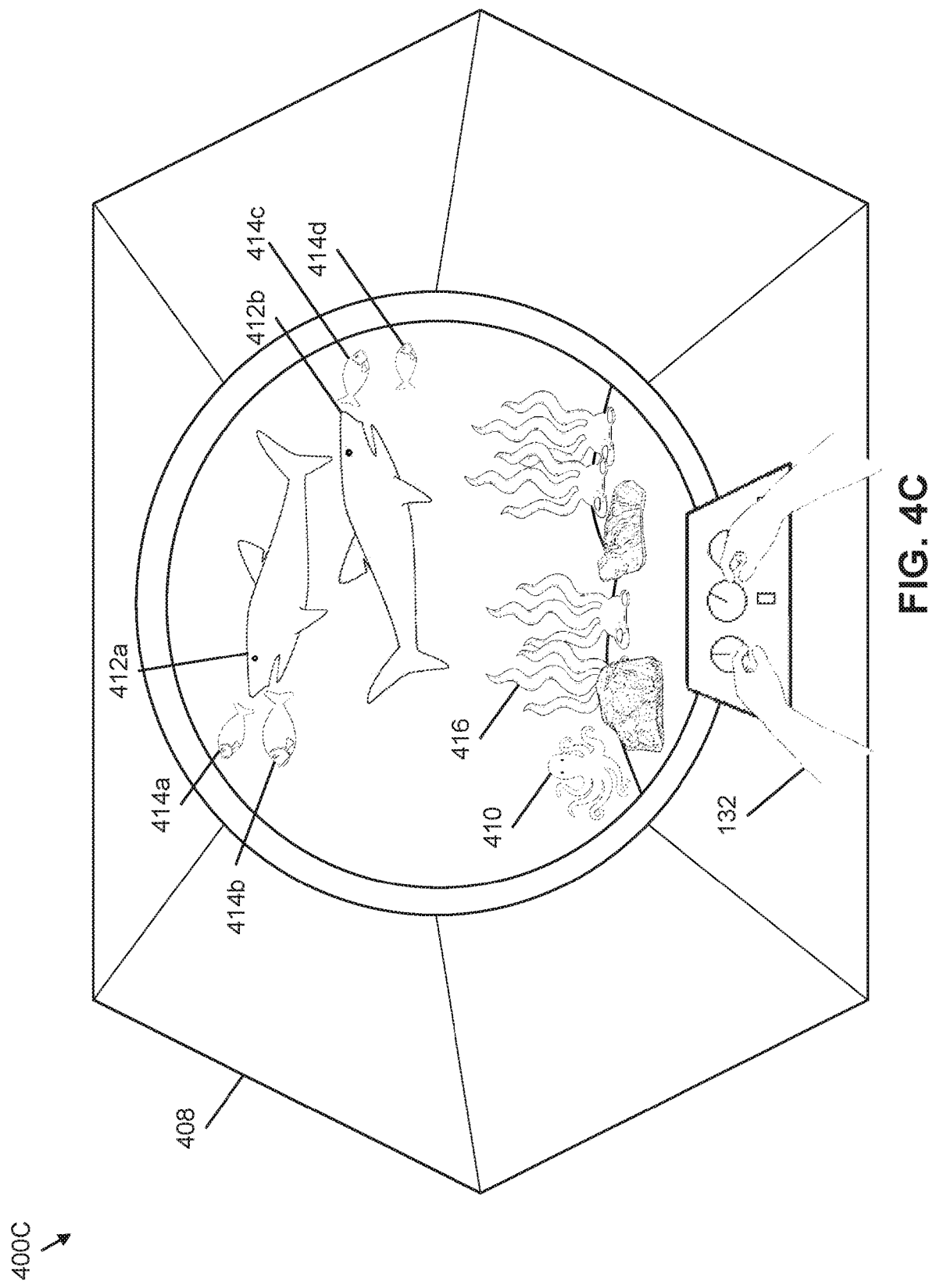

Referring to FIG. 4C, in the exemplary scenario 400C, the user 102 goes for underwater marine life exploration in a submarine. The user 102 is presented with the metaverse of how underwater marine life exploration in the submarine would appear at the future time period specified by the user 102. As shown in FIG. 4C, the metaverse of the underwater marine life exploration in the submarine includes the user avatar 132 of the user 102, a submarine avatar 408, a second octopus avatar 410, a first shark avatar 412a, a second shark avatar 412b, a first fish avatar 414a, a second fish avatar 414b, a third fish avatar 414c, a fourth fish avatar 414d, and a seaweed avatar 416. The metaverse of the underwater marine life exploration in the submarine may be created such that the user 102 may experience the underwater marine life exploration in the submarine via the metaverse client device 104 in 2-D, 3-D, or 2.5D options. The metaverse client device 104 may be configured to allow the user 102 to visualize underwater marine life exploration based on user actions. For example, the user 102 may view the marine life differently while the submarine is at different speeds.

Figure 4D:
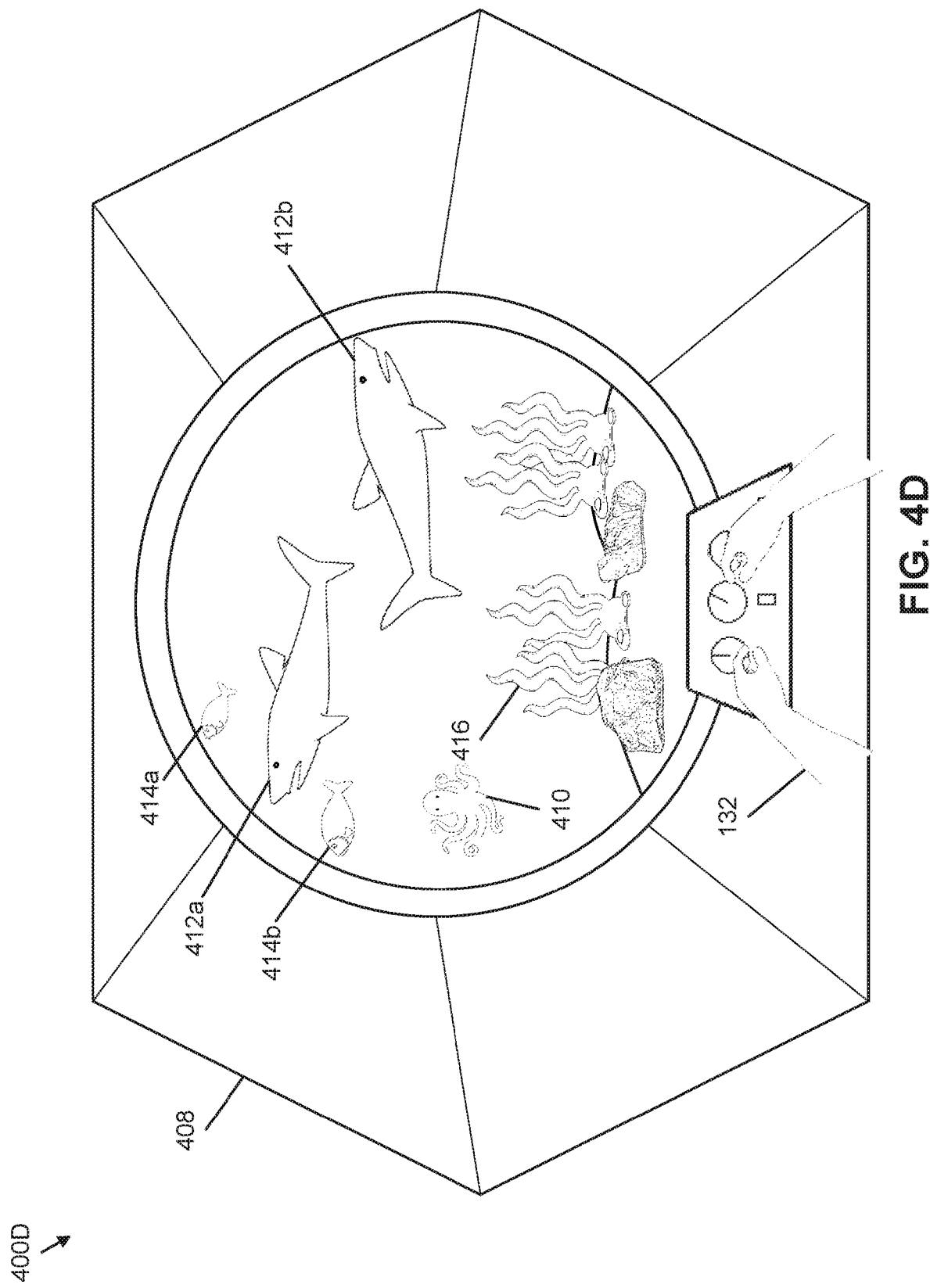

Referring to FIG. 4D, in the exemplary scenario 400D, the user avatar 132 moves from one point to another, underwater on the submarine avatar 408. Thus, the positions of the avatars change. The metaverse client device 104 may be configured to allow the user 102 to visualize the underwater marine life exploration based on the speed of the submarine avatar 408. For example, the user 102 may view the marine life differently while traveling at different speeds in the submarine avatar 408.

The user 102 may thus immersively experience how the underwater activity is likely to pan out at the specified future time period and make an informed decision accordingly. In a scenario, when the metaverse of the diving point indicates the occurrence of a cyclone in the diving point, the user 102 may decide to cancel the plans of diving in the diving point. In another scenario, when the metaverse of the diving point indicates good visibility and the presence of Beluga, the user 102 may decide to go diving at the diving point in the future time period.

The metaverse illustrated in each of FIGS. 4A-4D may additionally include various other elements (such as, seagrass, fishes, rocks, corals, or the like) which are not labeled in FIGS. 4A-4D so as to not obscure the drawings.

Figure 5A:
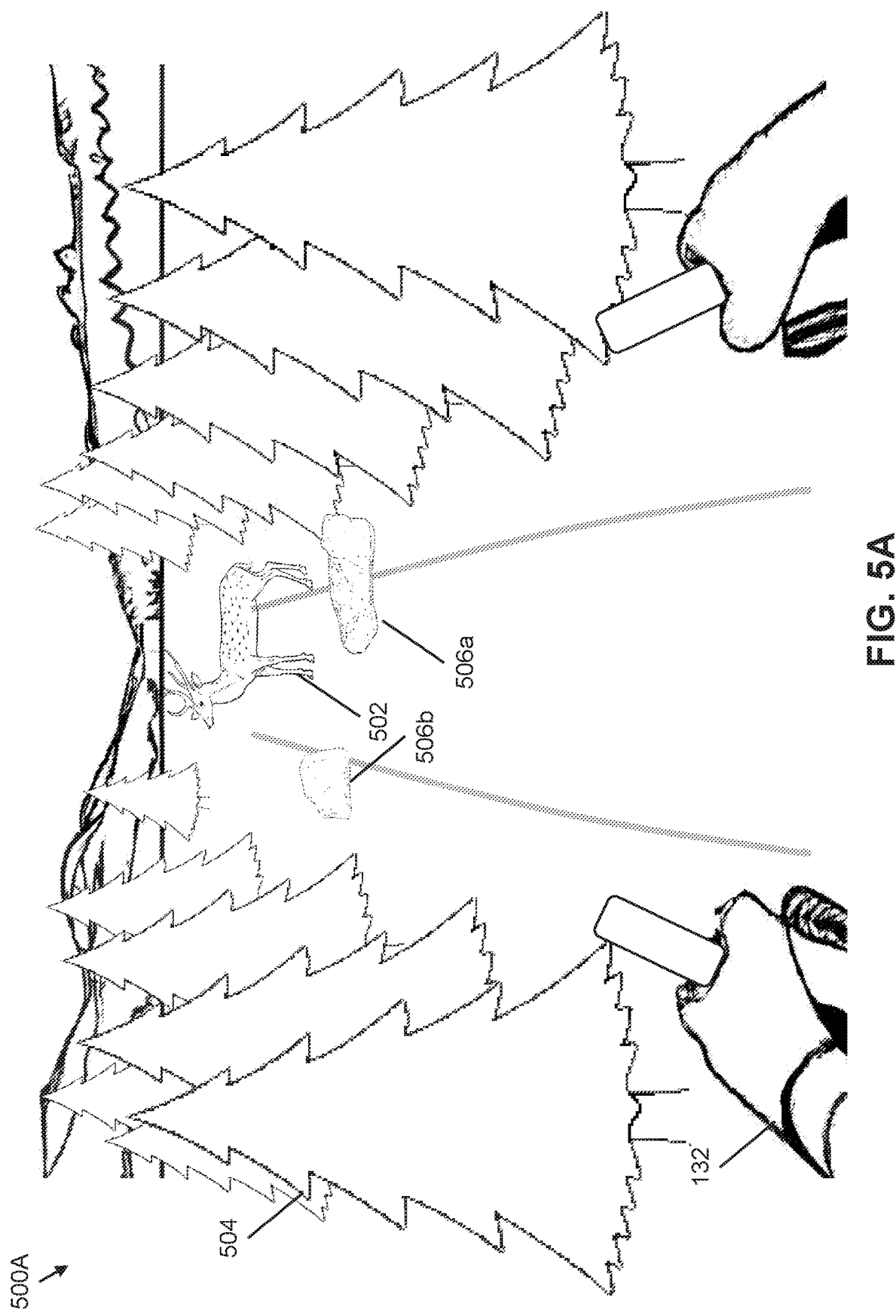
FIGS. 5A and 5B are diagrams that illustrate exemplary scenarios of the metaverse for the future scenario of skiing from the user POV, in accordance with an embodiment of the present disclosure.
Figure 5B:
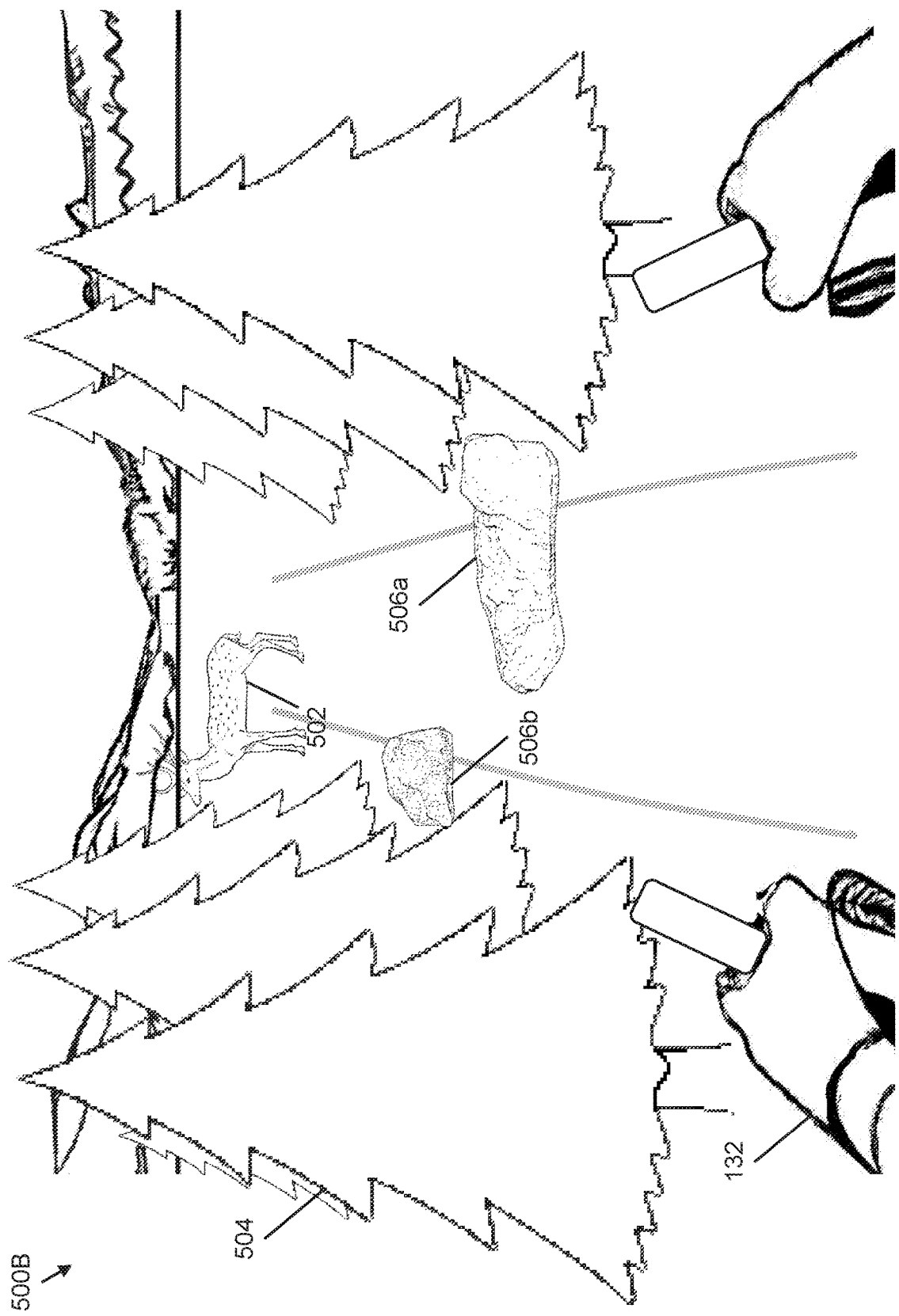

In another embodiment, the metaverse client device 104 allows the user 102 to select and board a vessel (not shown) from a plurality of vessels (e.g., ships, boats, or the like) and experience an aquatic ecosystem. The user avatar generation circuitry 128 may generate an avatar of the selected vessel. The user avatar 132 may further be allowed to perform a plurality of activities (e.g., diving, fishing, sunbathing, water skiing, or the like) on the selected vessel in the metaverse. Skiing:

FIGS. 5A and 5B are diagrams that illustrate exemplary scenarios 500A and 500B of the metaverse for the future scenario of skiing from the user POV, in accordance with an embodiment of the present disclosure. The exemplary scenarios 500A and 500B are described in conjunction with the metaverse client device 104.

In an exemplary scenario, the user 102 may be planning to go skiing and may wish to immersively experience a ski run, a ski course, or a ski slope before deciding. The ski run, a ski course, or a ski slope may refer to a location where the user 102 is interested to visit or explore a plurality of mogul skiing and ski run elements (such as slopes, terrains, turns, jumps, terrain parks, controlling speed, turning abilities, snow conditions, or the like). In such cases, the sensing circuitry 106 may collect or ingest real-world data of the ski run for enabling a virtual simulation of the ski run in the metaverse.

The first set of sensors 112 may detect the micro-weather of the ski run (e.g., the geographical region encompassing the ski run). In other words, the first set of sensors 112 may detect the plurality of real-time weather parameters of the ski run. In case of the ski run, the plurality of real-time weather parameters may include snowfall, snowpack, humidity, temperature, pressure, wind speed, wind direction, precipitation, solar radiation, visibility, and the like. In such a scenario, the first set of sensors 112 may include snow pillows, temperature sensors, pressure sensors, snow gauges, vibration sensors, humidity sensors, strain sensors, wind speed and direction sensors, precipitation and rain gauges, solar radiation sensors, visibility sensors, ceilometers, image sensors, and the like. The snow pillows are configured to measure snowpack along the ski run and the temperature sensors are configured to measure the temperature along the ski run, respectively. The pressure sensors are configured to measure atmospheric pressure levels of the ski run at various altitudes and the vibration sensors are configured to measure vibrations along the ski run for seismic activity. The humidity sensors are configured to measure humidity levels throughout the ski run and the strain sensors are configured to measure the amount of deformation in the snow when an external force is applied. The wind speed and direction sensors detect the direction and speeds of wind along the ski run and the precipitation and rain gauges measure rainfall in the ski run. The solar radiation sensors measure solar radiation in the ski run and the visibility sensors measure the visibility along the ski run. The ceilometers estimate cloud heights near the ski run and the image sensors capture images of the ski run. The first set of sensors 112 thus detects various weather parameters that may be utilized to accurately predict the weather conditions of the ski run at the future time period. Further, the first set of sensors 112 may transmit the detected plurality of real-time weather parameters to the weather prediction circuitry 120 of the metaverse server 108 via the communication network 110.

The weather prediction circuitry 120 predicts the micro-weather of the ski run for the future time period specified by the user 102. The weather prediction model of the weather prediction circuitry 120 may be trained based on the historical weather data of various ski runs (including the ski run to be explored by the user 102) and the trained weather prediction model may be configured to predict the micro-weather of the ski run based on the plurality of real-time weather parameters received from the first set of sensors 112.

The second set of sensors 114 may detect the plurality of real-time topographical parameters of the ski run. In case of the ski run, the plurality of real-time topographical parameters may include slope, trees, chutes, cliffs, steep drops, cornices, rolling terrain, moguls, or the like, and their characteristics such as sloping angle, size, curvature, sunlight exposure, pressure or the like. Thus, the second set of sensors 114 may include image sensors, LiDAR sensors, ultrasonic sensors, radars, satellites, drones, or the like. The image sensors capture images of the ski run and the LiDAR sensors are configured to capture the high-resolution 3D view of the ski run. Further, the ultrasonic sensors and the radars may be configured to measure the depth of the ski run using sound waves and electromagnetic waves respectively. Additionally, the satellites and the drones may capture aerial images of the ski run. Two or more sensors of the second set of sensors 114 may operate in conjunction to detect the plurality of real-time topographical parameters of the ski run. The second set of sensors 114 thus detects various topographical parameters that may be utilized to accurately generate the real topographical map of the ski run. Further, the second set of sensors 114 may transmit the detected plurality of real-time topographical parameters to the topography generation circuitry 122 via the communication network 110.

The topography generation circuitry 122 generates the real topographical map of the ski run that is to be explored by the user 102 based on at least one of the plurality of real-time topographical parameters and the historical topographical data of the ski run. The topographical map generation engine of the topography generation circuitry 122 may generate the base layer of the real topographical map based on the historical topographical data associated with the ski run. Further, the topographical map generation engine processes the plurality of real-time topographical parameters of the ski run to generate the real topographical map of the ski run. The topography generation circuitry 122 may also receive the predicted micro-weather of the ski run from the weather prediction circuitry 120 and update the real topographical map of the ski run based on the predicted micro-weather to generate the predicted topographical map of the ski run for the future time period.

The third set of sensors 116 may detect the plurality of real-time biodiversity parameters of the plurality of biodiversity elements in the ski run. In case of the ski run, the plurality of biodiversity elements includes animals, birds, rodents, insects, trees, flowers, and the like, present in the ski run. The plurality of real-time biodiversity parameters includes the behavior pattern and the characteristics of the plurality of biodiversity elements. Further, the third set of sensors 116 may transmit the detected plurality of real-time biodiversity parameters to the biodiversity avatar generation circuitry 124 via the communication network 110.

The biodiversity avatar generation circuitry 124 predicts the plurality of behavioral aspects of the plurality of biodiversity elements based on at least one of the plurality of real-time biodiversity parameters, the historical biodiversity data of the plurality of biodiversity elements, the predicted micro-weather of the ski run for the future time period, and the predicted topographical map of the ski run for the future time period. Further, the biodiversity avatar generation circuitry 124 predicts, based on the plurality of behavioral aspects of the plurality of biodiversity elements, the one or more biodiversity elements of the plurality of biodiversity elements to be present in the ski run at the future time period. The biodiversity avatar generation circuitry 124 generates the one or more biodiversity avatars of one or more biodiversity elements, respectively that are predicted to be present along the ski run at the future time period. The one or more biodiversity avatars include the avatars of animals, birds, rodents, insects, trees, flowers, or the like, predicted to be present in the ski run at the future time period.

The aforementioned weather, topographical, and biodiversity parameters and the associated types of sensors are exemplary and the scope of the present disclosure is not limited to these. In other embodiments, various other types of weather, topographical, and biodiversity parameters may be sensed by way of corresponding sensors, without deviating from the scope of the present disclosure.

The weather simulation circuitry 126 receives the predicted micro-weather from the weather prediction circuitry 120 and the predicted topographical map from the topography generation circuitry 122. The weather simulation circuitry 126 adds the one or more dynamic elements to the predicted topographical map of the ski run. For example, when the predicted micro-weather for the future time period is indicative of a snowstorm, the one or more dynamic elements include strong winds, low visibility, colder temperature, snow accumulation, or the like. Additionally, the weather simulation circuitry 126 may allow the one or more dynamic elements to be interactive with the user 102, the one or more biodiversity avatars, and the predicted topographical map.

The fourth set of sensors 118 may detect the plurality of user parameters. Further, the user avatar generation circuitry 128 receives the plurality of user parameters from the fourth set of sensors 118 via the communication network 110 and generates the user avatar 132. The user avatar generation circuitry 128 further generates one or more accessory avatars associated with the user 102 and the activity. For example, the metaverse client device 104 may allow the user 102 to select a mode from a plurality of modes to experience the selected ski run. Examples of plurality of modes may include, snowboarding, skiing, ski fox, snow rafting, ice skating, or the like. The user avatar generation circuitry 128 may be further configured to generate avatars of gears that are to be utilized during skiing. The one or more accessory avatars include avatars of snowboards, skiing equipment, rafts, or the like.

The metaverse generation circuitry 130 generates the metaverse for the future scenario of the user 102 skiing in the ski run at the future time period specified by the user 102. The metaverse generation circuitry 130 generates the metaverse based on the predicted micro-weather of the ski run, the predicted topographical map of the ski run, and the plurality of behavioral aspects of the plurality of biodiversity elements predicted for the future time period. Further, the generated metaverse includes the predicted topographical map of the ski run, the one or more dynamic elements added to the predicted topographical map, the one or more biodiversity avatars of the one or more biodiversity elements, respectively that are predicted to be present in the trail at the future time period, the user avatar 132 of the user 102. and the one or more accessory avatars. The generated metaverse is presented to the user 102 by way of the metaverse client device 104.

Now referring to FIG. 5A, in the exemplary scenario 500A, the user 102 is presented with the metaverse of the ski run. As shown in FIG. 5A, the metaverse includes the user avatar 132 of the user 102, a reindeer avatar 502, a pine avatar 504, a first boulder avatar 506a, and a second boulder avatar 506b. The reindeer avatar 502 corresponds to the avatar of the one or more biodiversity elements predicted to be present in the trail at the future time period. The metaverse of the ski run may be created such that the user 102 may experience the ski run via the metaverse client device 104 in 2-D, 3-D, or 2.5D options.

Referring to FIG. 5B, in the exemplary scenario 500B, the user avatar 132 proceeds through the ski run. Thus, the positions of avatars change. The metaverse client device 104 may be configured to allow the user 102 to visualize the ski run based on user actions. For example, the user 102 may view the ski run differently while skiing at different speeds. In an example, the user avatar 132 may trip and fall when colliding with the first boulder avatar 506a in the metaverse of the ski run. As a result, the user avatar 132 may be severely injured. In another example, the user 102 may experience cold winds as the user avatar 132 is skiing down a slope. In one example, the ski run may include a frozen lake, when the user avatar 132 is skiing through the frozen lake, the user avatar 132 may drown in the lake due to the breakage of ice formed on the lake.

Although it is described that the metaverse is generated for skiing in the ski run, the scope of the present disclosure is not limited to it. In an embodiment, the metaverse may be generated for various modes such as snowboarding, ski fox, snow rafting, ice skating, or the like.

In another embodiment, the user 102 may select snow rafting and further select to experience the selected ski run solo or in a group. The group may include avatars of friends, family, or random strangers as per user preference.

The user 102 may thus immersively experience how the skiing activity is likely to pan out at the specified future time period and make an informed decision accordingly. In a scenario, when the metaverse of the ski run indicates that the ski run is not firm, the user 102 may take a decision to not go skiing in the ski run. In another scenario, when the metaverse of the ski run indicates clear sky and pleasant weather, the user 102 may decide to go skiing.

The metaverse illustrated in each of FIGS. 5A and 5B may additionally include various other elements (such as, pine trees, mountains, or the like) which are not labeled in FIGS. 5A and 5B so as to not obscure the drawings.

Event Venue:

FIGS. 6A-6D are diagrams that illustrate exemplary scenarios 600A-600D of the metaverse for the future scenario of attending an event from the user POV, in accordance with an embodiment of the present disclosure. The exemplary scenarios 600A-600D are described in conjunction with the metaverse client device 104.

In an exemplary scenario, the user 102 may be planning to attend an event at an event venue such as a stadium, an arena, or the like, and may wish to immersively experience the event venue. A stadium is a place or venue for outdoor sports (such as football, cricket, hockey, or the like), concerts, or other events. The stadium consists of a field or stage either partly or completely surrounded by a tiered structure designed to allow spectators to stand or sit and view the event. Examples of the stadium may include an open stadium, an oval-shaped stadium, a horseshoe-shaped stadium, or the like. An arena is a large enclosed platform, designed to showcase theatre, musical performances, or sporting events. It is composed of a large open space surrounded on most or all sides by tiered seating for spectators, and is covered by a roof. In such cases, the sensing circuitry 106 may collect or ingest real-world data of the event venue for enabling a virtual simulation of the event venue in the metaverse.

The first set of sensors 112 may detect the micro-weather of the event venue (e.g., the geographical region encompassing the event venue). In other words, the first set of sensors 112 may detect the plurality of real-time weather parameters of the event venue. In case of the event venue, the plurality of real-time weather parameters may include temperature, pressure, dust particles, mist, allergens, pollutants, wind speed, wind direction, precipitation, humidity, solar radiation, presence of smoke, visibility, or the like. In such a scenario, the first set of sensors 112 may include temperature sensors, pressure sensors, dust particulate sensors, vibration sensors, humidity sensors, strain sensors, smoke detector sensors, wind speed and direction sensors, precipitation and rain gauges, solar radiation sensors, visibility sensors, ceilometers, image sensors, air quality sensors, or the like. The temperature sensors measure the temperature of the event venue and the pressure sensors measure atmospheric pressure in the event venue. Further, the dust particulate sensors measure presence of dust particles in the event venue and the vibration sensors measure vibrations in the event venue. Additionally, the humidity sensors measure humidity in the stadium and the smoke detector sensors detect smoke particles (such as cigarette smoke particles) in the event venue. Further, the wind speed and direction sensors detect direction and speeds of wind in the event venue and the precipitation and rain gauges measure rainfall in the event venue. Additionally, the solar radiation sensors measure solar radiation in the event venue and the visibility sensors measure the visibility in the event venue. Further, the ceilometers measure aerosol concentration in the event venue and the image sensors capture images of the event venue. Additionally, the air quality sensors detect ammonia, carbon monoxide, carbon dioxide, nitric oxide, nitrogen dioxide, ozone, particulate matter, sulfur dioxide, volatile organic compounds, or the like in the event venue. Further, the first set of sensors 112 may transmit the detected plurality of real-time weather parameters to the weather prediction circuitry 120 via the communication network 110.

The weather prediction circuitry 120 predicts the micro-weather of the event venue for the future time period specified by the user 102. The weather prediction model of the weather prediction circuitry 120 may be trained based on the historical weather data of various event venues (including the event venue to be visited by the user 102) and the trained weather prediction model may be configured to predict the micro-weather of the event venue based on the plurality of real-time weather parameters received from the first set of sensors 112.

The second set of sensors 114 may detect the plurality of real-time topographical parameters of the event venue. In case of the event venue, the plurality of real-time topographical parameters may include seating area, pitch, dug-out, stage, ridges, depressions, flood lights, or the like, and their characteristics such as height, width, length, thickness, depth, or the like. Thus, the second set of sensors 114 may include image sensors, LiDAR sensors, audio sensors, GPS sensors, satellites, drones, or the like. The image sensors capture images of the stadium and the LiDAR sensors capture a high-resolution 3D view of the event venue. The GPS sensor may provide location data to estimate the number of people in the event venue. Additionally, the satellites and the drones may capture aerial images of the event venue. Two or more sensors of the second set of sensors 114 may operate in conjunction to detect the plurality of real-time topographical parameters of the event venue. The second set of sensors 114 thus detects various topographical parameters that may be utilized to accurately generate the real topographical map of the event venue. Further, the second set of sensors 114 may transmit the detected plurality of real-time topographical parameters to the topography generation circuitry 122 via the communication network 110.

The topography generation circuitry 122 generates the real topographical map of the event venue based on at least one of the plurality of real-time topographical parameters and the historical topographical data of the event venue. The topography generation circuitry 122 may also receive the predicted micro-weather from the weather prediction circuitry 120. Further, the topography generation circuitry 122 updates the real topographical map of the event venue based on the predicted micro-weather to generate the predicted topographical map of the event venue for the future time period.

The third set of sensors 116 may detect the plurality of real-time biodiversity parameters of the plurality of biodiversity elements in the stadium. The plurality of biodiversity elements includes human beings. The plurality of real-time biodiversity parameters includes the behavior pattern and the characteristics of the plurality of biodiversity elements. Further, the third set of sensors 116 may transmit the detected plurality of real-time biodiversity parameters to the biodiversity avatar generation circuitry 124 via the communication network 110.

The biodiversity avatar generation circuitry 124 predicts the plurality of behavioral aspects associated with the human beings, based on at least one of the plurality of real-time biodiversity parameters, the historical biodiversity data associated with the human beings, the predicted micro-weather of the ski run for the future time period, and the predicted topographical map of the event venue for the future time period. In an embodiment, the biodiversity avatar generation circuitry 124 may be configured to receive booking data of the event venue for the time period specified by the user 102 from an entity associated with the event venue. Additionally, the biodiversity avatar generation circuitry 124 may receive a seat number of the user 102 in the event venue, from the metaverse client device 104. Further, based on the received booking data, the biodiversity avatar generation circuitry 124 predicts the plurality of behavioral aspects associated with the spectators. For example, the biodiversity avatar generation circuitry 124 may receive booking data for a final football match. The received booking data may include age, height, ethnicity, gender, or the like, for a plurality of spectators. Based on the received booking data the biodiversity avatar generation circuitry 124 may predict the obstruction and noise levels the user 102 may face due to a group of spectators sitting in the next row.

The biodiversity avatar generation circuitry 124 further predicts, based on the plurality of behavioral aspects of the human beings, one or more human beings to be present in the event venue at the future time period. The biodiversity avatar generation circuitry 124 may generate the one or more biodiversity avatars of one or more human beings. The one or more biodiversity avatars include avatars of spectators, guards, food vendors, or the like, predicted to be present in the event venue at the future time period.

The aforementioned weather, topographical, and biodiversity parameters and the associated types of sensors are exemplary and the scope of the present disclosure is not limited to these. In other embodiments, various other types of weather, topographical, and biodiversity parameters may be sensed by way of corresponding sensors, without deviating from the scope of the present disclosure.

The weather simulation circuitry 126 receives the predicted micro-weather from the weather prediction circuitry 120 and the predicted topographical map from the topography generation circuitry 122. The weather simulation circuitry 126 adds the one or more dynamic elements to the predicted topographical map of the event venue. In an example, when the predicted micro-weather for the future time period specified by the user 102 is indicative of a cloudy day, the one or more dynamic elements include mild winds, clouds, or the like. In another example, when the predicted micro-weather for the future time period is indicative of a clear sky environment, the weather simulation circuitry 126 may simulate a clear sky environment. The clear sky environment may include clear sky, stars, moon, or the like. Additionally, the weather simulation circuitry 126 may allow the one or more dynamic elements to be interactive with the user 102, the one or more biodiversity avatars, and the predicted topographical map.

The fourth set of sensors 118 may detect the plurality of user parameters. Further, the user avatar generation circuitry 128 receives the plurality of user parameters from the fourth set of sensors 118 via the communication network 110 and generates the user avatar 132. The user avatar generation circuitry 128 further generates one or more accessory avatars associated with the user 102 and the activity. For example, the user 102 may select an outfit from a plurality of outfits to be worn by the user 102 for the stadium visit, presented through the metaverse client device 104. The user avatar generation circuitry 128 generates the outfit avatars for the selected outfit. The one or more accessory avatars include avatars of sunglass, a watch, shoes, a shirt, and pants that are included in the selected outfit.

The metaverse generation circuitry 130 generates the metaverse for the future scenario of the user 102 attending the event at the event venue at the future time period. The metaverse generation circuitry 130 generates the metaverse for the future scenario of the user 102 attending the event venue based on the predicted micro-weather, the predicted topographical map of the event venue, and the plurality of behavioral aspects of the plurality of biodiversity elements predicted for the future time Further, the generated metaverse includes the predicted topographical map of the event venue, the one or more dynamic elements added to the predicted topographical map, the one or more biodiversity avatars of the one or more biodiversity elements, the user avatar 132 of the user 102, and the one or more accessory avatars. The generated metaverse may be presented to the user 102 by way of the metaverse client device 104.

Figure 6A:
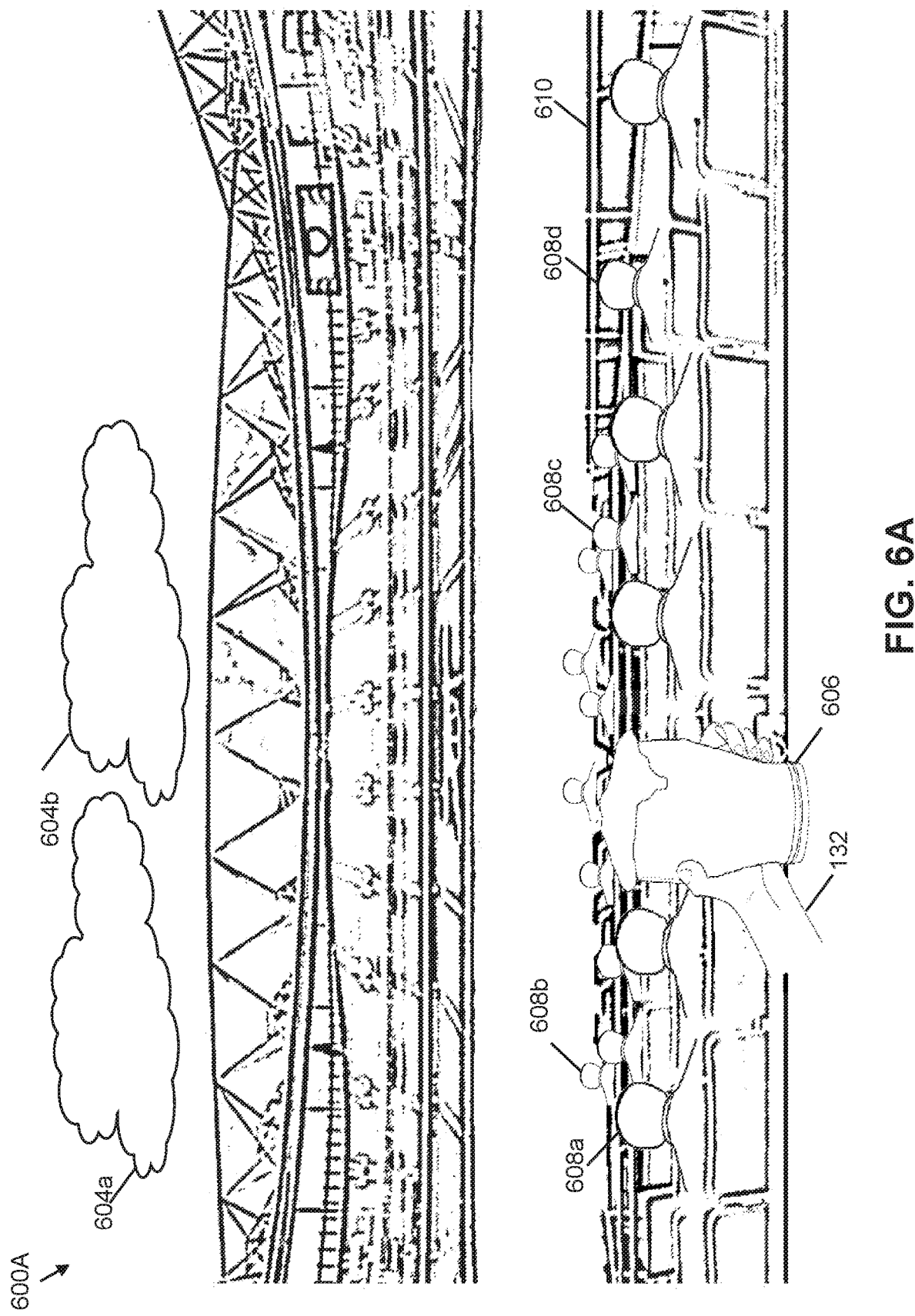
FIGS. 6A-6D are diagrams that illustrate exemplary scenarios of the metaverse for the future scenario of attending an event from the user POV, in accordance with an embodiment of the present disclosure.

Now referring to FIG. 6A, in the exemplary scenario 600A, the user 102 is presented with the metaverse of how a stadium would appear at the time period specified by the user 102.

As shown in FIG. 6A, the metaverse of the stadium includes the user avatar 132 of the user 102, a first cloud element 604a, a second cloud element 604b, a coffee cup avatar 606, a first spectator avatar 608a, a second spectator avatar 608b, a third spectator avatar 608c, a fourth spectator avatar 608d, and seating arrangement avatar 610. For the sake of brevity, only the first to fourth spectator avatars are labeled in FIG. 6A. The metaverse of the stadium may be created such that the user 102 may experience the stadium visit via the metaverse client device 104 in 2-D, 3-D, or 2.5D options.

Figure 6B:
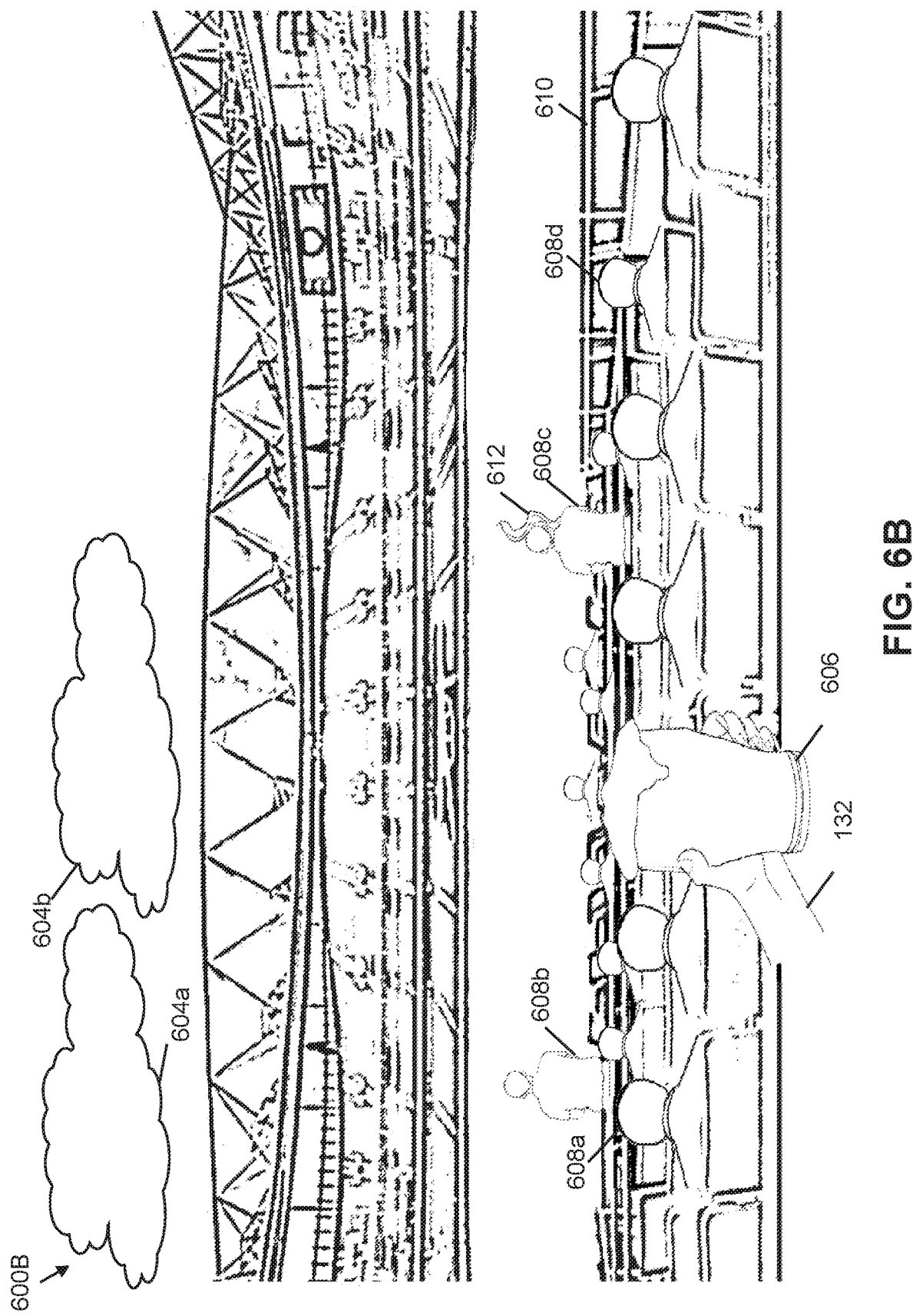

Referring to FIG. 6B, in the exemplary scenario 600B, the second spectator avatar 608b and the third spectator avatar 608c are standing. Further, the third spectator avatar 608c is smoking and a smoke avatar 612 is illustrated in the metaverse of the stadium. In an example, due to the presence of the smoke avatar 612 in the stadium, visibility in the stadium is reduced. The user 102 may experience loud noises in the stadium as predicted by the biodiversity avatar generation circuitry 124 based on the plurality of behavioral aspects of the spectators present in the stadium via the metaverse client device 104. In another example, when it starts raining in the stadium (not shown), the spectator avatars may start rushing toward the exit of the stadium. In another example, when the outfit of the user avatar 132 includes sunglasses, the user 102 experiences the metaverse of the stadium as viewed through the sunglasses. In yet example, the user avatar 132 may initiate a conversation with the first spectator avatar 608a. The user 102 experiences the behavior of the spectators in the stadium through the metaverse of the stadium.

In one scenario, when the user 102 plans to visit the stadium for a football match, the weather prediction circuitry 120 predicts the chances of rainfall in the future time period specified by the user 102. In such a scenario, the metaverse may include cloud elements, raindrop elements, lightning elements, and the like. Further, the number of spectators in the stadium may be less than the number of seats booked in the stadium due to the prediction of rainfall. In another scenario, when the user 102 plans to visit the stadium for a concert, the metaverse of the stadium may show spectators dancing during the concert.

FIGS. 6A and 6B illustrate scenarios where the event venue is a stadium. However, in other embodiments, the event venue may be an arena. The metaverse of such a scenario is illustrated in FIGS. 6C and 6D.

Figure 6C:
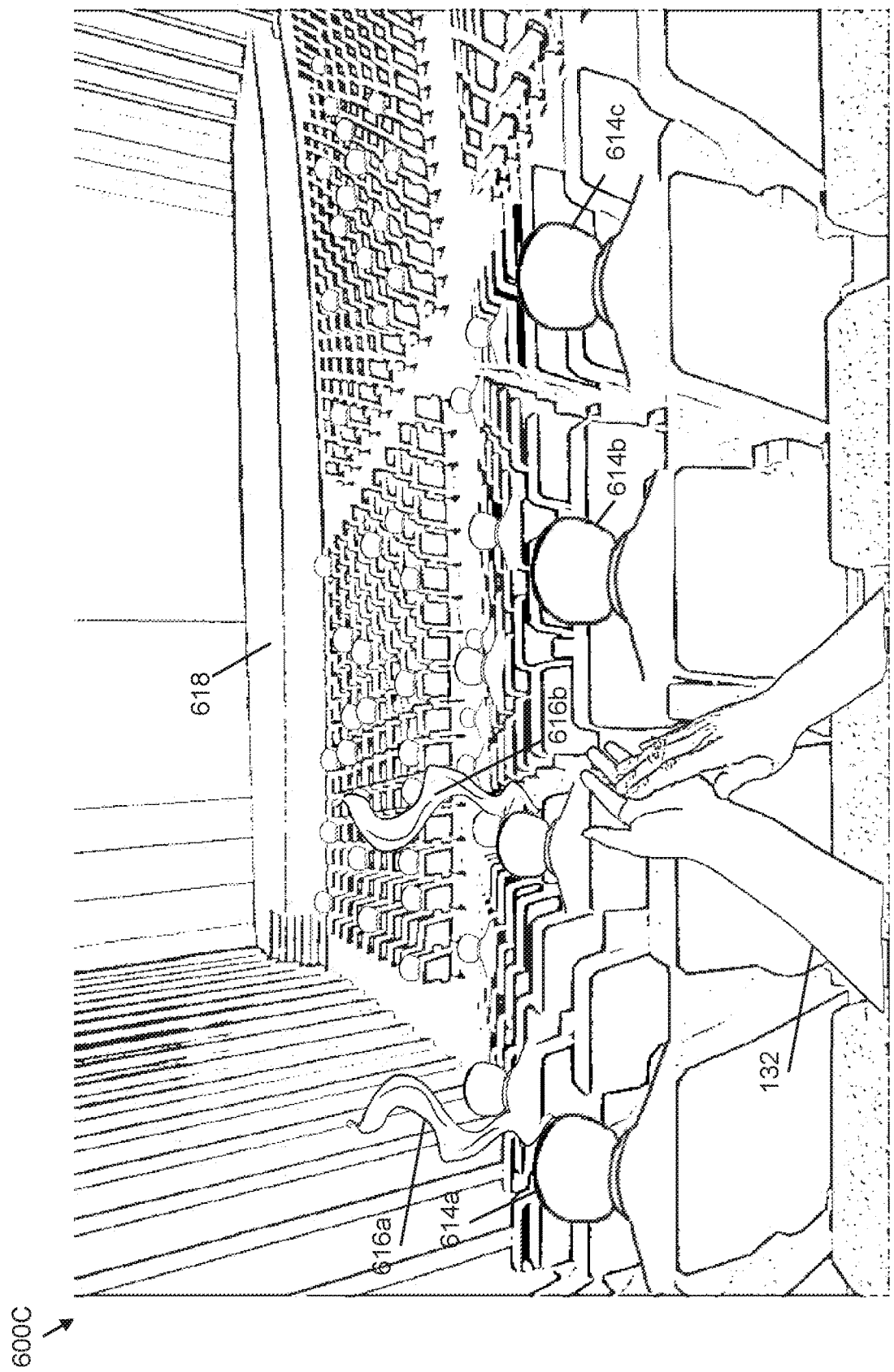

Referring to FIG. 6C, in the exemplary scenario 600C, the user 102 is presented with the metaverse of how an arena would appear at the future time period specified by the user 102.

As shown in FIG. 6C, the metaverse of the arena includes the user avatar 132 of the user 102, a first audience member avatar 614a, a second audience member avatar 614b, a third audience member avatar 614c, a second smoke avatar 616a, a third smoke avatar 616b, and a stage avatar 618. For the sake of brevity, only first to third audience member avatars are labeled in FIG. 6C. In an example, the event in the arena is a concert. The metaverse of the arena may be created such that the user 102 may experience the visit to the arena via the metaverse client device 104 in 2-D, 3-D, or 2.5D options.

Figure 6D:
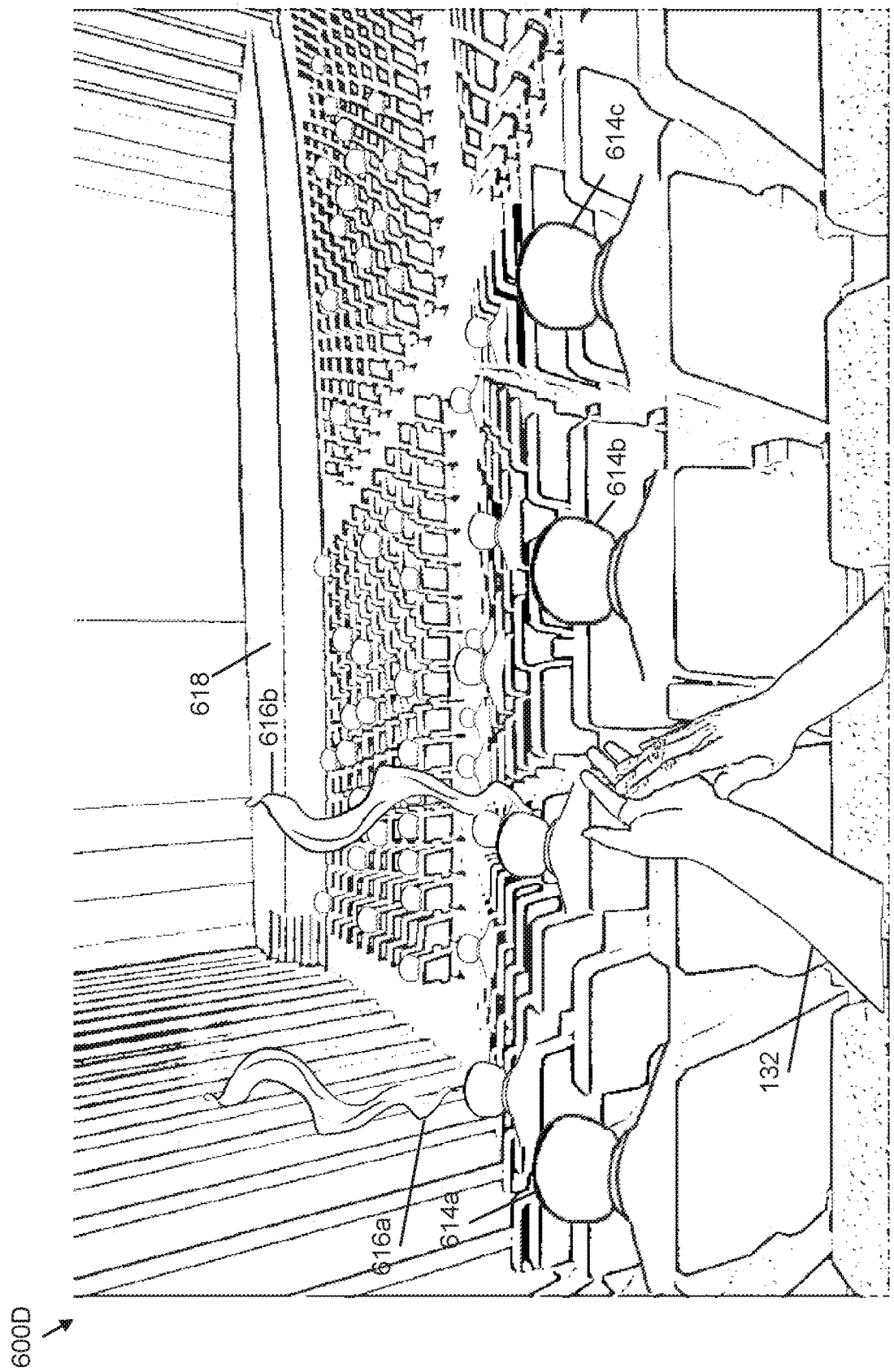

Referring to FIG. 6D, in the exemplary scenario 600D, the second smoke avatar 616a and the third smoke avatar 616b are moving upward. Further, due to the presence of the second and third smoke avatars 616a and 616b in the arena, visibility in the arena is reduced as the arena is an enclosed space. Further, the user 102 may experience an increase in temperature due to the second and third smoke avatars 616a and 616b. In a scenario, lit cigarette butts thrown away by audience members may cause a fire hazard in the arena. In such a scenario, audience members may start rushing toward the exit of the arena and the user avatar 132 may be injured due to trampling. In another scenario, the user 102 may experience the audience avatars singing along in the concert as predicted by the biodiversity avatar generation circuitry 124 via the metaverse client device 104.

The user 102 may thus immersively experience how attending the event is likely to pan out at the specified future time period and make an informed decision accordingly. In a scenario, when the metaverse of the stadium indicates that the visibility is low due to smoke and fog, the user 102 may decide to cancel the visit to the stadium. In another scenario, when the metaverse of the stadium indicates clear sky and pleasant temperature, the user 102 may decide to visit the stadium in the future time period.

The aforementioned activities and geographical locations are exemplary and the scope of the present disclosure is not limited to these. In other embodiments, metaverse may be generated for various other activities in various other geographical locations, without deviating from the scope of the present disclosure.

The metaverse illustrated in each of FIGS. 6A-6D may additionally include various other elements (such as, spectators, audience members, or the like) which are not labeled in FIGS. 6A-6D so as to not obscure the drawings.

Figure 7A:
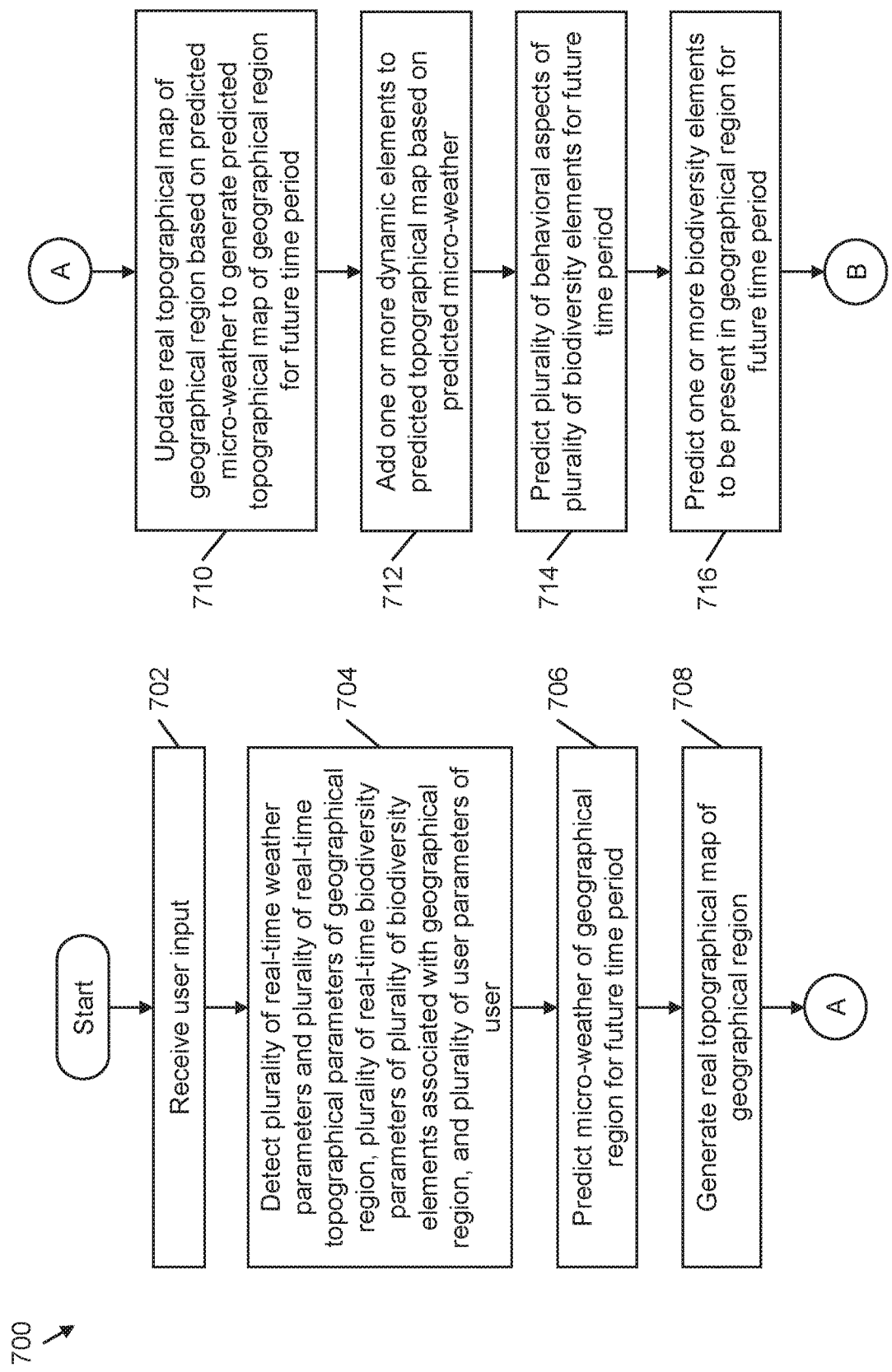
FIGS. 7A and 7B, collectively, represent a flowchart that illustrates a method for creating the metaverse for the future scenario, in accordance with an embodiment of the present disclosure.
Figure 7B:
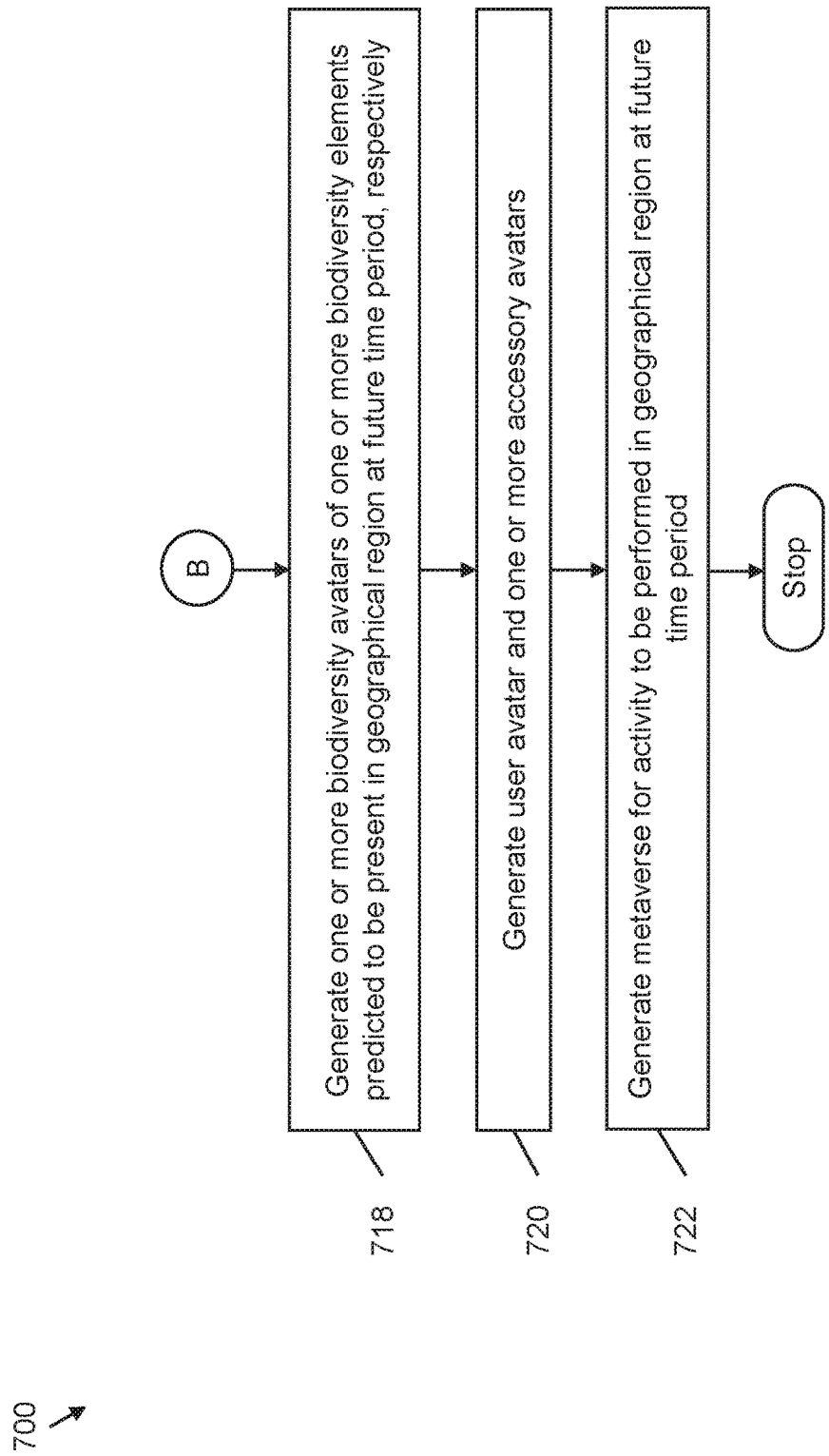

FIGS. 7A and 7B, collectively, represent a flowchart 700 that illustrates a method for creating the metaverse for the future scenario, in accordance with an embodiment of the present disclosure. The flowchart 700 describes the operations performed by the metaverse server 108 to create the metaverse for the future scenario.

Referring to FIG. 7A, at 702, the metaverse generation circuitry 130 may receive the user input. The user input may be indicative of at least one of the activities to be performed by the user 102, the geographical region associated with the activity, and the future time period to perform the activity. Based on the received user input, the sensing circuitry 106 may collect the real-world data regarding the activity. At 704, the sensing circuitry 106 may detect the plurality of real-time weather parameters and the plurality of the real-time topographical parameters of the geographical region, the plurality of real-time biodiversity parameters of the plurality of biodiversity elements associated with the geographical region, and the plurality of the user parameters of the user.

At 706, the weather prediction circuitry 120 may predict the micro-weather of the geographical region for the future time period. The micro-weather may be predicted based on the plurality of real-time weather parameters and the historical weather data of the geographical region. At 708, the topography generation circuitry 122 may generate the real topographical map of the geographical region. The real topographical map may be generated based on at least one of the plurality of real-time topographical parameters and the historical topographical data of the geographical region. At 710, the topography generation circuitry 122 may update the real topographical map of the geographical region based on the predicted micro-weather to generate the predicted topographical map of the geographical region for the future time period. In other words, the generated real topographical map is updated based on the predicted micro-weather to add a realistic overview to the predicted topographical map.

At 712, the weather simulation circuitry 126 may add one or more dynamic elements to the predicted topographical map based on the predicted micro-weather. At 714, the biodiversity avatar generation circuitry 124 may predict the plurality of behavioral aspects of the plurality of biodiversity elements for the future time period. The plurality of behavioral aspects may be predicted based on at least one of the plurality of real-time biodiversity parameters, the historical biodiversity data, the predicted micro-weather, and the predicted topographical map. At 716, the biodiversity avatar generation circuitry 124 may predict the one or more biodiversity elements to be present in the geographical region for the future time period.

Referring to FIG. 7B, at 718, the biodiversity avatar generation circuitry 124 may generate the one or more biodiversity avatars of the one or more biodiversity elements, respectively that are predicted to be present in the geographical region at the future time period, respectively. At 720, the user avatar generation circuitry 128 may generate the user avatar 132 and the one or more accessory avatars. At 722, the metaverse generation circuitry 130 may generate the metaverse for the activity to be performed in the geographical region at the future time period. The generated metaverse is presented to the user 102 via the metaverse client device 104.

Thus, in the present invention, the user 102 immersively experiences the activity through the metaverse and may plan the chosen activity based on the experience. The metaverse server 108 provides accurate information about the activity to the user 102. Further, the immersive experience may enhance user engagement and improve decision-making for the user 102. As a result, undesirable situations such as natural calamities that may be experienced by the user 102 while performing the activity during the future time period are avoided. Further, when the metaverse of the activity to be performed at the future time period indicates a pleasant experience of the activity, the user 102 is motivated to take up the activity.

In an embodiment of the present disclosure, the metaverse system is disclosed. The metaverse system may include the metaverse generation circuitry 130. The metaverse generation circuitry 130 may be configured to generate the metaverse for the activity to be performed by the user 102 in the geographical region at the future time period. The metaverse may be generated based on the micro-weather of the geographical region predicted for the future time period, the predicted topographical map of the geographical region for the future time period, and the plurality of behavioral aspects of the plurality of biodiversity elements associated with the geographical region predicted for the future time period. The predicted topographical map may be generated based on the real topographical map of the geographical region and the predicted micro-weather for the future time period. Further, the generated metaverse may include the predicted topographical map of the geographical region, the one or more biodiversity avatars of the one or more biodiversity elements, of the plurality of biodiversity elements, respectively that are predicted to be present in the geographical region at the future time period and the user avatar 132 of the user 102. The prediction of the presence of the one or more biodiversity elements may be based on the plurality of the behavioral aspects of the plurality of biodiversity elements. Additionally, the metaverse may be presented to the user 102 to enable the user 102 to immersively experience the activity that is to be performed at the future time period.

In another embodiment of the present disclosure, the method for creating the metaverse for the future scenario is disclosed. The method may include generating the metaverse for the activity to be performed by the user 102 in the geographical region at the future time period, by the metaverse generation circuitry 130. The metaverse may be generated based on the micro-weather of the geographical region predicted for the future time period, the predicted topographical map of the geographical region for the future time period, and the plurality of behavioral aspects of a plurality of biodiversity elements associated with the geographical region predicted for the future time period. The predicted topographical map may be generated based on the real topographical map of the geographical region and the predicted micro-weather for the future time period. The generated metaverse may include the predicted topographical map of the geographical region and the one or more biodiversity avatars of the one or more biodiversity elements, of the plurality of biodiversity elements, respectively that are predicted to be present in the geographical region at the future time period based on the plurality of behavioral aspects of the plurality of biodiversity elements. Additionally, the generated metaverse may include the user avatar 132 of the user 102. Further, the metaverse may be presented to the user 102 to enable the user 102 to immersively experience the activity that is to be performed at the future time period.

In some embodiments, the activity may correspond to one of hiking, cycling, star gazing, sightseeing, skiing, rock climbing, underwater exploration, and attending an event.

In some embodiments, the geographical region is one of the trail, the ski run, the rock climbing route, the water body, and the event venue. When the activity may correspond to one of hiking, cycling, star gazing, and sightseeing, the geographical region is the trail. When the activity may correspond to skiing, the geographical region is the ski run.

When the activity may correspond to rock climbing, the geographical region is the rock climbing route. Additionally, when the activity may correspond to underwater exploration, the geographical region is the water body. Further, when the activity may correspond to attending the event, the geographical region is the event venue.

In some embodiments, the metaverse system may further include the weather prediction circuitry 120. The weather prediction circuitry 120 may be configured to predict the micro-weather of the geographical region for the future time period based on the plurality of real-time weather parameters of the geographical region and the historical weather data associated with the geographical region.

In some embodiments, the plurality of real-time weather parameters may include at least two of temperature, pressure, dust particles, mist, allergens, pollutants, wind speed, wind direction, precipitation, humidity, solar radiation, presence of smoke, visibility, wave attributes, water temperature, rainfall, snowfall, snowpack, salinity, and Coriolis force.

In some embodiments, the metaverse system may further include the topography generation circuitry 122. The topography generation circuitry 122 may be configured to generate the real topographical map of the geographical region based on the plurality of real-time topographical parameters of the geographical region and the historical topographical data associated with the geographical region. Further, the topography generation circuitry 122 may update the real topographical map based on the predicted micro-weather to generate the predicted topographical map.

In some embodiments, the plurality of real-time topographical parameters may include characteristics of at least two of cliffs, plateaus, plains, hills, contours, ridges, depressions, elevations, rivers, lakes, valleys, seating areas, pitch, dugout, stage, chutes, steep drops, cornices, rolling terrain, moguls, flood lights, ocean ridges, continental shelves, trenches, sea canyons, and sea corals. Further, the characteristics include at least one of a group consisting of the height, the width, the number, the length, the thickness, the depth, the sloping angle, the size, the curvature, and the sunlight exposure.

In some embodiments, the metaverse system may further include the weather simulation circuitry 126. The weather simulation circuitry 126 may be configured to add the one or more dynamic elements to the predicted topographical map based on the predicted micro-weather. The one or more dynamic elements may include at least one of the strong winds, mild winds, rainfall, thundering sounds, mist, fog, snowfall, and ocean currents. The generated metaverse may further include the one or more dynamic elements added to the predicted topographical map.

In some embodiments, the metaverse system may further include the biodiversity avatar generation circuitry 124. Further, the biodiversity avatar generation circuitry 124 may be configured to predict the plurality of behavioral aspects of the plurality of biodiversity elements associated with the geographical region for the future time period based on at least one of the plurality of real-time biodiversity parameters of the plurality of biodiversity elements, the historical biodiversity data of the plurality of biodiversity elements, the predicted micro-weather, and the predicted topographical map. Further, the biodiversity avatar generation circuitry 124 may predict the one or more biodiversity elements to be present in the geographical region for the future time period, based on the plurality of behavioral aspects of the plurality of biodiversity elements. Additionally, the biodiversity avatar generation circuitry 124 may generate the one or more biodiversity avatars of the one or more biodiversity elements, respectively that are predicted to be present in the geographical region at the future time period.

In some embodiments, the plurality of biodiversity elements may include at least two of animals, organisms, birds, worms, plants, human beings, grasses, bushes, mosses, mammals, turtles, fishes, seaweeds, seagrasses, insects, rodents, and trees associated with the geographical location. The plurality of real-time biodiversity parameters may include behavior patterns and characteristics of the plurality of biodiversity elements. The behavior pattern may include at least one of migration, camouflage, hibernation, social behavior, foraging, and adaptation of each biodiversity element, and the characteristics include shape, color, size, sound, and movement of each biodiversity element.

In some embodiments, the metaverse system may further include the user avatar generation circuitry 128 configured to generate the user avatar 132 of the user 102 based on the plurality of user parameters.

In some embodiments, the plurality of user parameters may include at least two of body shape, movement, voice, facial structure, and expressions.

In some embodiments, the user avatar generation circuitry 128 may be further configured to generate the one or more accessory avatars associated with the user 102 and the activity. The one or more accessory avatars may correspond to at least one of the user outfit avatar, the vehicle avatar associated with the activity, and the equipment avatar associated with the activity. The generated metaverse may further include the one or more accessory avatars.

In some embodiments, the metaverse system may further include the weather prediction circuitry 120, the topography generation circuitry 122, the weather simulation circuitry 126, the biodiversity avatar generation circuitry 124, and the user avatar generation circuitry 128. The weather prediction circuitry 120 may be configured to predict the micro-weather of the geographical region for the future time period. The predicted micro-weather may be based on the plurality of real-time weather parameters of the geographical region and the historical weather data associated with the geographical region. The topography generation circuitry 122 may be configured to generate the real topographical map of the geographical region based on the plurality of real-time topographical parameters of the geographical region and the historical topographical data associated with the geographical region. The topography generation circuitry 122 may be further configured to update the real topographical map based on the predicted micro-weather to generate the predicted topographical map of the geographical region for the future time period. The weather simulation circuitry 126 may be configured to add the one or more dynamic elements to the predicted topographical map based on the predicted micro-weather. The generated metaverse may further include the one or more dynamic elements added to the predicted topographical map. The biodiversity avatar generation circuitry 124 may be configured to predict the plurality of behavioral aspects of the plurality of biodiversity elements associated with the geographical region for the future time period. The plurality of behavioral aspects may be precited based on at least one of the plurality of real-time biodiversity parameters of the plurality of biodiversity elements, the historical biodiversity data of the plurality of biodiversity elements, the predicted micro-weather, and the predicted topographical map. Further, the biodiversity avatar generation circuitry 124 may predict the one or more biodiversity elements to be present in the geographical region for the future time period based on the plurality of behavioral aspects of the plurality of biodiversity elements. Additionally, the biodiversity avatar generation circuitry 124 may generate the one or more biodiversity avatars of the one or more biodiversity elements, respectively that are predicted to be present in the geographical region at the future time period. The user avatar generation circuitry 128 may be configured to generate the user avatar 132 of the user 102 based on the plurality of user parameters.

In some embodiments, the metaverse system may further include the sensing circuitry 106. The sensing circuitry 106 may be configured to detect at least one of the plurality of real-time weather parameters of the geographical regions, the plurality of real-time topographical parameters of the geographical region, the plurality of real-time biodiversity parameters of the plurality of biodiversity elements associated with the geographical region, and the plurality of user parameters of the user 102.

In some embodiments, the metaverse generation circuitry 130 may be further configured to receive the user input. The user input includes at least one of the activity to be performed by the user 102, the geographical region associated with the activity, and the future time period. The metaverse may be generated in response to the user input.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A metaverse system, comprising:
   weather prediction circuitry configured to predict micro-weather of a geographical region for a future time period based on a plurality of real-time weather parameters of the geographical region and historical weather data associated with the geographical region;
   topography generation circuitry configured to:
      generate a real topographical map of the geographical region based on at least one of a plurality of real-time topographical parameters of the geographical region and historical topographical data associated with the geographical region; and
      update, based on the predicted micro-weather, the real topographical map to generate a predicted topographical map of the geographical region for the future time period;
   weather simulation circuitry configured to add, based on the predicted micro-weather, one or more dynamic elements to the predicted topographical map;
   biodiversity avatar generation circuitry configured to:
      predict a plurality of behavioral aspects of a plurality of biodiversity elements associated with the geographical region for the future time period based on at least one of (i) a plurality of real-time biodiversity parameters of the plurality of biodiversity elements, (ii) historical biodiversity data of the plurality of biodiversity elements, (iii) the predicted micro-weather, and (iv) the predicted topographical map;
      predict, based on the plurality of behavioral aspects of the plurality of biodiversity elements, one or more biodiversity elements, of the plurality of biodiversity elements, to be present in the geographical region for the future time period; and
      generate one or more biodiversity avatars of the one or more biodiversity elements predicted to be present in the geographical region at the future time period;
   user avatar generation circuitry configured to generate a user avatar of a user based on a plurality of user parameters; and
   metaverse generation circuitry configured to generate a metaverse for an activity to be performed by the user in the geographical region at the future time period, wherein
      the metaverse is generated based on (i) the micro-weather of the geographical region, (ii) the predicted topographical map of the geographical region, and (iii) the plurality of behavioral aspects of the plurality of biodiversity elements associated with the geographical region,
      the generated metaverse comprises (i) the predicted topographical map of the geographical region, (ii) the one or more biodiversity avatars of the one or more biodiversity elements, (iii) the user avatar of the user, and (iv) the one or more dynamic elements added to the predicted topographical map, and
      the metaverse is presented to the user to enable the user to immersively experience the activity that is to be performed at the future time period.

2. The metaverse system of claim 1, wherein the activity corresponds to one of (i) hiking, (ii) cycling, (iii) star gazing, (iv) sightseeing, (v) skiing, (vi) rock climbing, (vii) underwater exploration, and (viii) attending an event.

3. The metaverse system of claim 2, wherein
   the geographical region corresponds to one of (i) a trail, (ii) a ski run, (iii) a rock climbing route, (iv) a water body, and (v) an event venue,
   when the activity corresponds to one of the hiking, the cycling, the star gazing, and the sightseeing, the geographical region corresponds to the trail,
   when the activity corresponds to the skiing, the geographical region corresponds to the ski run,
   when the activity corresponds to the rock climbing, the geographical region corresponds to the rock climbing route,
   when the activity corresponds to the underwater exploration, the geographical region corresponds to the water body, and
   when the activity corresponds to attending the event, the geographical region corresponds to the event venue.

4. The metaverse system of claim 1, wherein the plurality of real-time weather parameters comprises at least two of (i) temperature, (ii) pressure, (ii) dust particles, (iii) mist, (iv) allergens, (v) pollutants, (vi) wind speed, (vii) wind direction, (viii) precipitation, (ix) humidity, (x) solar radiation, (xi) presence of smoke, (xii) visibility, (xiii) wave attributes, (xiv) water temperature, (xv) rainfall, (xvi) snowfall, (xvii) snowpack (xviii) salinity, and (xix) Coriolis force.

5. The metaverse system of claim 1, wherein
   the plurality of real-time topographical parameters comprises characteristics of at least two of (i) a cliff, (ii) a plateau, (iii) a plain, (iv) a hill, (v) a contour, (vi) a ridge, (vii) a depression, (viii) an elevation, (ix) a river, (x) a lake, (xi) a valley, (xii) a seating area, (xiii) a pitch, (xiv) a dugout, (xv) a stage, (xvi) a chute, (xvii) a steep drop, (xviii) a cornice, (xix) a rolling terrain, (xx) a mogul, (xxi) a flood light, (xxii) an ocean ridge, (xxiii) a continental shelf, (xxiv) a trench, (xxv) a sea canyon, and (xxiii) a sea coral, and
   the characteristics comprises at least one of a group consisting of (i) height, (ii) width, (iii) a number, (iv)

length, (v) thickness, (vi) depth, (vii) a sloping angle, (viii) size, (ix) a curvature, and (x) sunlight exposure.

6. The metaverse system of claim 1, wherein the one or more dynamic elements comprise at least one of (i) a strong wind, (ii) a mild wind, (iii) rainfall, (iv) a thundering sound, (v) mist, (vi) fog, (vii) snowfall, and (viii) an ocean current.

7. The metaverse system of claim 1, wherein
the plurality of biodiversity elements comprises at least two of (i) an animal, (ii) an organism, (iii) a bird, (iv) a worm, (v) a human being, (vi) a plant, (vii) a grass, (viii) a bush, (ix) a moss, (x) a mammal, (xi) turtle, (xii) a fish, (xiii) a seaweed, (xiv) a seagrass, (xv) an insect, (xvi) a rodent, and (vii) a tree associated with the geographical region,
the plurality of real-time biodiversity parameters comprises a behavior pattern of the plurality of biodiversity elements and characteristics of the plurality of biodiversity elements,
the behavior pattern comprises at least one of migration, camouflage, hibernation, social behavior, foraging, and adaptation of each biodiversity element of the plurality of biodiversity elements, and
the characteristics comprises a shape, a color, a size, a sound, and a movement of each biodiversity element of the plurality of biodiversity elements.

8. The metaverse system of claim 1, wherein the plurality of user parameters comprises at least two of (i) a body shape, (ii) a movement, (iii) a voice, (iv) a facial structure, and (v) an expression of the user.

9. The metaverse system of claim 1, wherein
the user avatar generation circuitry is further configured to generate one or more accessory avatars associated with the user and the activity,
the one or more accessory avatars correspond to at least one of (i) a user outfit avatar, (ii) a vehicle avatar associated with the activity, and (iii) an equipment avatar associated with the activity, and
the generated metaverse further comprises the one or more accessory avatars.

10. The metaverse system of claim 1, further comprising sensing circuitry configured to detect at least one of (i) the plurality of real-time weather parameters of the geographical region, (ii) the plurality of real-time topographical parameters of the geographical region, (iii) the plurality of real-time biodiversity parameters of the plurality of biodiversity elements associated with the geographical region, and (iv) the plurality of user parameters of the user.

11. The metaverse system of claim 1, wherein
the metaverse generation circuitry is further configured to receive a user input,
the user input comprises at least one of (i) the activity to be performed by the user, (ii) the geographical region associated with the activity, and (iii) the future time period, and
the metaverse is generated in response to the user input.

12. A method, comprising:
predicting, by weather prediction circuitry, micro-weather of a geographical region for a future time period based on a plurality of real-time weather parameters of the geographical region and historical weather data associated with the geographical region;
generating, by topography generation circuitry, a real topographical map of the geographical region based on at least one of a plurality of real-time topographical parameters of the geographical region and historical topographical data associated with the geographical region;
updating, by the topography generation circuitry based on the predicted micro-weather, the real topographical map to generate a predicted topographical map of the geographical region for the future time period;
adding, by weather simulation circuitry based on the predicted micro-weather, one or more dynamic elements to the predicted topographical map;
predicting, by biodiversity avatar generation circuitry, a plurality of behavioral aspects of a plurality of biodiversity elements associated with the geographical region for the future time period based on at least one of (i) a plurality of real-time biodiversity parameters of the plurality of biodiversity elements, (ii) historical biodiversity data of the plurality of biodiversity elements, (iii) the predicted micro-weather, and (iv) the predicted topographical map;
predicting, by the biodiversity avatar generation circuitry based on the plurality of behavioral aspects of the plurality of biodiversity elements, one or more biodiversity elements, of the plurality of biodiversity elements, to be present in the geographical region for the future time period;
generating, by the biodiversity avatar generation circuitry, one or more biodiversity avatars of the one or more biodiversity elements predicted to be present in the geographical region at the future time period, respectively;
generating, by user avatar generation circuitry, a user avatar of a user based on a plurality of user parameters; and
generating, by metaverse generation circuitry, a metaverse for an activity to be performed by the user in the geographical region at the future time period, wherein
the metaverse is generated based on (i) the micro-weather of the geographical region, (ii) the predicted topographical map of the geographical region, and (iii) the plurality of behavioral aspects of the plurality of biodiversity elements associated with the geographical region,
the generated metaverse comprises (i) the predicted topographical map of the geographical region, (ii) the one or more biodiversity avatars of the one or more biodiversity elements (iii) the user avatar of the user, and (iv) the one or more dynamic elements added to the predicted topographical map, and
the metaverse is presented to the user to enable the user to immersively experience the activity that is to be performed at the future time period.

13. The method of claim 12, further comprising generating, by the user avatar generation circuitry, one or more accessory avatars associated with the user and the activity, wherein
the one or more accessory avatars correspond to at least one of (i) a user outfit avatar, (ii) a vehicle avatar associated with the activity, and (iii) an equipment avatar associated with the activity, and
the generated metaverse further comprises the one or more accessory avatars.

14. The method of claim 12, further comprising receiving, by the metaverse generation circuitry, a user input, wherein
the user input comprises at least one of (i) the activity to be performed by the user, (ii) the geographical region associated with the activity, and (iii) the future time period, and
the metaverse is generated in response to the user input.

* * * * *